(12) United States Patent
Wang

(10) Patent No.: US 12,348,753 B2
(45) Date of Patent: Jul. 1, 2025

(54) CODING OF PICTURE ORDER COUNT IN VIDEO BITSTREAMS

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/990,932

(22) Filed: Nov. 21, 2022

(65) Prior Publication Data

US 2023/0077443 A1   Mar. 16, 2023

Related U.S. Application Data

(63) Continuation of application No. PCT/US2021/033780, filed on May 21, 2021.
(Continued)

(51) Int. Cl.
*H04N 19/46*   (2014.01)
*H04N 19/105*   (2014.01)
(Continued)

(52) U.S. Cl.
CPC ........... *H04N 19/46* (2014.11); *H04N 19/105* (2014.11); *H04N 19/172* (2014.11);
(Continued)

(58) Field of Classification Search
CPC .... H04N 19/46; H04N 19/105; H04N 19/172; H04N 19/70
(Continued)

(56) References Cited

U.S. PATENT DOCUMENTS

| 7,440,626 | B2 | 10/2008 | Kong |
| 9,521,393 | B2 | 12/2016 | Wang |

(Continued)

FOREIGN PATENT DOCUMENTS

| CN | 105027570 A | 11/2015 |
| CN | 105830447 A | 8/2016 |

(Continued)

OTHER PUBLICATIONS

Document: JVET-R2001-vA; Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
(Continued)

*Primary Examiner* — Marnie A Matt
(74) *Attorney, Agent, or Firm* — Conley Rose, P.C.

(57) ABSTRACT

Methods, systems and devices for coding the picture order count in video bitstream processing. An example method of video processing includes performing a conversion between a video comprising one or more pictures and a bitstream of the video, wherein the bitstream conforms to a format rule, wherein the format rule specifies that a derivation of a picture associated with a first flag and in a decoding process for a picture order count is based on a second flag, wherein the picture associated with the first flag is a previous picture in a decoding order that has (i) a first identifier that is the same as a slice or picture header referring to a reference picture list syntax structure, (ii) a second identifier and the second flag being equal to zero, and (iii) a picture type different from a random access skipped leading picture and a random access decodable leading picture.

20 Claims, 16 Drawing Sheets

Related U.S. Application Data

(60) Provisional application No. 63/029,321, filed on May 22, 2020.

(51) Int. Cl.
    *H04N 19/169* (2014.01)
    *H04N 19/172* (2014.01)
    *H04N 19/423* (2014.01)
    *H04N 19/70* (2014.01)

(52) U.S. Cl.
    CPC ......... *H04N 19/188* (2014.11); *H04N 19/423* (2014.11); *H04N 19/70* (2014.11)

(58) Field of Classification Search
    USPC .................................................. 375/240.26
    See application file for complete search history.

(56) References Cited

U.S. PATENT DOCUMENTS

| | | |
|---|---|---|
| 11,973,968 B2 | 4/2024 | Wang |
| 2002/0136298 A1 | 9/2002 | Anantharamu |
| 2010/0232508 A1 | 9/2010 | Kang |
| 2013/0170561 A1 | 7/2013 | Hannuksela et al. |
| 2013/0191550 A1 | 7/2013 | Hannuksela |
| 2013/0273945 A1 | 10/2013 | Deshpande |
| 2013/0279600 A1 | 10/2013 | Toma |
| 2014/0003489 A1 | 1/2014 | Hannuksela |
| 2014/0086341 A1 | 3/2014 | Wang |
| 2014/0086343 A1 | 3/2014 | Wang |
| 2014/0098895 A1 | 4/2014 | Wang |
| 2014/0192149 A1 | 7/2014 | Wang |
| 2014/0192882 A1 | 7/2014 | Wang et al. |
| 2014/0218473 A1 | 8/2014 | Hannuksela et al. |
| 2014/0301476 A1 | 10/2014 | Deshpande |
| 2014/0355692 A1 | 12/2014 | Ramasubramonian et al. |
| 2015/0016547 A1 | 1/2015 | Tabatabai et al. |
| 2015/0023409 A1 | 1/2015 | Schierl et al. |
| 2015/0103921 A1* | 4/2015 | Hannuksela ......... H04N 19/152 375/240.26 |
| 2015/0103927 A1* | 4/2015 | Hannuksela ......... H04N 19/159 375/240.26 |
| 2015/0110192 A1 | 4/2015 | Wang |
| 2015/0110473 A1 | 4/2015 | Wang et al. |
| 2015/0131744 A1 | 5/2015 | Samuelsson |
| 2015/0172679 A1 | 6/2015 | Choi |
| 2015/0189322 A1 | 7/2015 | He |
| 2015/0271498 A1 | 9/2015 | Wang |
| 2015/0271528 A1 | 9/2015 | Wang |
| 2015/0358640 A1 | 12/2015 | Hendry |
| 2015/0373346 A1 | 12/2015 | Wang |
| 2015/0382023 A1 | 12/2015 | Ramasubramonian et al. |
| 2016/0044324 A1 | 2/2016 | Deshpande |
| 2016/0191926 A1 | 6/2016 | Deshpande et al. |
| 2016/0191931 A1 | 6/2016 | Hannuksela |
| 2017/0134737 A1 | 5/2017 | Lu et al. |
| 2017/0214923 A1 | 7/2017 | He |
| 2017/0238001 A1 | 8/2017 | Li et al. |
| 2017/0257639 A1 | 9/2017 | Sullivan et al. |
| 2017/0353718 A1 | 12/2017 | Rodriguez et al. |
| 2018/0139469 A1 | 5/2018 | Lainema |
| 2018/0220161 A1 | 8/2018 | Schierl et al. |
| 2018/0255296 A1 | 9/2018 | Wang |
| 2018/0376154 A1 | 12/2018 | Deshpande |
| 2019/0058895 A1 | 2/2019 | Deshpande |
| 2019/0075311 A1 | 3/2019 | Deshpande |
| 2019/0158880 A1 | 5/2019 | Deshpande |
| 2019/0174144 A1* | 6/2019 | Hannuksela ........... H04N 19/70 |
| 2019/0289310 A1 | 9/2019 | Sullivan et al. |
| 2020/0077107 A1 | 3/2020 | Deshpande |
| 2020/0154101 A1 | 5/2020 | Li et al. |
| 2021/0203970 A1 | 7/2021 | Choi |
| 2021/0227239 A1* | 7/2021 | Choi ..................... H04N 19/44 |
| 2021/0368183 A1 | 11/2021 | Deshpande |
| 2021/0368196 A1* | 11/2021 | Choi .................... H04N 19/172 |
| 2021/0409698 A1* | 12/2021 | Sychev ................ H04N 19/593 |
| 2022/0021896 A1* | 1/2022 | Hendry ................ H04N 19/159 |
| 2022/0217386 A1* | 7/2022 | Wang .................... H04N 19/43 |

FOREIGN PATENT DOCUMENTS

| | | |
|---|---|---|
| CN | 105981387 A | 9/2016 |
| CN | 108141616 A | 6/2018 |
| EP | 3123724 B1 | 2/2020 |
| JP | 2016506698 A | 3/2016 |
| JP | 2016518763 A | 6/2016 |
| JP | 2016540414 A | 12/2016 |
| JP | 2017522795 A | 8/2017 |
| JP | 2017525234 A | 8/2017 |
| JP | 2023508095 A | 2/2023 |
| JP | 2023526585 A | 6/2023 |
| WO | 2020103931 A1 | 5/2020 |
| WO | 2021237165 A1 | 11/2021 |

OTHER PUBLICATIONS

"Information Technology—High Efficiency Coding and media delivery in heterogeneous environments—Part 2: High Efficiency Video Coding", Rec. ITU-T H.265 | ISO/IEC 23008-2:2001x (Fourth Edition), ISO/IEC JTC 1/SC 29/WG 11 N17661, Apr. 20, 2018, 8 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
VTM software, Retrieved from the internet: https://vcgit.hhi.fraunhofer.de/jvet/VVCSoftware_VTM.git, Feb. 14, 2023, 3 pages.
"Information technology—Coding of audio-visual objects—Part 12: ISO base media file format, Technocal Corrigendum 1," ISO/IEC FDIS 14496-12:2020(E), ISO/IEC 14496-12, Jun. 3, 2016, 303 pages.
Qualcomm Incorporated, "Editor's Version of Dash Is 4th Edition," ISO/IEC 23009-1ISO/IEC JTC1/SC29/WG11 MPEG2019/m52458, Jan. 20, 200, 287 pages.
Sullivan, G. et al., "Overview of the High Efficiency Video Coding (HEVC) Standard," IEEE Transactions on Circuits and Systems for Video Technology, vol. 22, No. 12, Dec. 2012, 20 pages.
Deshpande, S., et al., "An Improved Hypothetical Reference Decoder For HEVC," Proceedings of SPIE—The International Society for Optical Engineering, 13 pages.
Sjoberg, R., et al., "Overview of the HEVC High-Level Syntax and Reference Picture Management," IEEE Transactions On Circuits and Systems for Video Technology, vol. 22, No. 12, Dec. 2012, 13 pages.
Wenger, S., et al., "Transport and Signaling of SVC in IP Networks," IEEE Transactions on Circuits and Systems for Video Technology, vol. 17, No. 9, Sep. 2007, 10 pages.
Foreign Communication From a Counterpart Application, International Application No. PCT/US2021/033780, International Search Report dated Aug. 23, 2021, 38 pages.
Foreign Communication From a Counterpart Application, International Application No. PCT/US2021/033783, International Search Report dated Sep. 29, 2021, 10 pages.
Foreign Communication From a Counterpart Application, International Application No. PCT/US2021/033785, International Search Report dated Aug. 23, 2021, 28 pages.
Foreign Communication From a Counterpart Application, International Application No. PCT/US2021/033786, International Search Report dated Sep. 14, 2021, 15 pages.
Foreign Communication From a Counterpart Application, International Application No. PCT/US2021/033//9, International Search Report dated Oct. 6, 2021, 17 pages.

(56) References Cited

OTHER PUBLICATIONS

"Series H: Audiovisual and Multimedia Systems Infrastructure of audiovisual services—Coding of moving video Versatile video coding," Recommendation ITU-T H.266, Apr. 2020, 536 pages.
Foreign Communication From A Related Counterpart Application, Indian Application No. 202247067117, Indian Office Action dated Apr. 25, 2023, 6 pages.
Non-Final Office Action dated Mar. 6, 2023, U.S. Appl. No. 17/990,959, filed Nov. 21, 2022.
Non-Final Office Action dated Mar. 17, 2023, U.S. Appl. No. 17/990,945, filed Nov. 21, 2022.
Non-Final Office Action dated Apr. 27, 2023, U.S. Appl. No. 17/992,287, filed Nov. 22, 2022.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages. pp. p. 45-p. 146, p. 447—p. 467.
Document: JVET-S0157-v1, Wang, Y., "AHG9: HRD and related cleanups," Joint Video Experts Team (JVET) of ITU- T SG 16 WP 3 and ISO/IEC JTC 1/SC 29/WG 11 19th Meeting: by teleconference, Jun. 22-Jul. 1, 2020, 7 pages.
Document: JVET-S2001-v8, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 545 pages. pp. p. 37-p. 181, p. 454-p. 492.
Document: JVET-R2001-VA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages. pp. p. 37-p. 184, p. 447-p. 488.
Document: JVET-80081-v1, Hendry, "AHG9: On non-referenced picture and POC derivation," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.
Document: JVET-S2001-v8, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 545 pages. pp. p. 37-p. 189, p. 454-p. 497.
Foreign Communication From A Related Counterpart Application, European Application No. 218083988, Extended European Search Report dated Jul 4, 2023, 11 pages.
Foreign Communication From A Related Counterpart Application, European Application No. 218080505, Extended European Search Report dated Jul. 14, 2023, 12 pages.
Document: JVET-R2001-VB, Bross, B., et al., "Versatile Video Coding (Draft 9)," Joint Video Experts Team (JVET) of ITU-T SG 16 WP 3 and ISO/IEC JTC 1/SC 29NVG 11 18th Meeting: by teleconference, Apr. 15-24, 2020, 530 pages.
Document: JCTVC-L0328, Sullivan, G., et al., "HRD issue for bitstream splicing," Joint Collaborative Team on Video Coding (JCT-VC) of ITU-T SG 16 WP 3 and ISO/IEC JTC 1/SC 29NVG 11 12th Meeting: Geneva, CH, Jan. 14-23, 2013, 5 pages.
Document: JVET-R2001-VA, Bross, B., et al., "Versatile Video Coding (Draft 9)," Joint Video Experts Team (JVET) ot ITU-T SG 16 WP 3 and ISO/IEC JTC 1/SC 29NVG 11 18th Meeting: by teleconference, Apr. 15-24, 2020, 524 pages.
Document: JVET-Q2001-VE, Bross, B., et al., "Versatile Video Coding (Draft 8)," Joint Video Experts Team (JVET) 01 ITU-T SG 16 WP 3 and ISO/IEC JTC 1/SC 29NVG 11 17th Meeting: Brussels, BE, Jan. 7-17, 2020, 513 pages.
Korean Office Action from Korean Patent Application No. 10-2022-7044041 dated Apr. 24, 2024, 8 pages.
"Series H: Audiovisual And Multimedia Systems Infrastructure Of Audiovisual Services—Coding Of Moving Video," Telecommunication Standardization Sector Of ITU, Infrastructure of Audiovisual Services—Coding of Moving Video, High Efficiency Video Coding, ITU-T H.265, CH, Nov. 2019, 712 Pages.
Extended European Search Report for European Application No. 218084721, mailed Jul. 20, 2023, 10 Pages.
Extended European Search Report for European Application No. 218092906, mailed Jul. 20, 2023, 10 Pages.
Foreign Communication From A Related Counterpart Application, Office Action for Indian Application No. 202247071727, mailed Feb. 3, 2023, 6 Pages.
Foreign Communication From A Related Counterpart Application, Office Action for Indian Application No. 202247071766, mailed Feb. 6, 2023, 5 Pages.
Foreign Communication From A Related Counterpart Communication, International Search Report and Written Opinion for International Application No. PCT/US/2021/036473, mailed Sep. 16, 2021, 17 Pages.
Foreign Communication From A Related Counterpart Communication, International Search Report and Written Opinion for International Application No. PCT/US2021/033648, mailed Aug. 24, 2021, 13 Pages.
Foreign Communication From A Related Counterpart Communication, International Search Report and Written Opinion for International Application No. PCT/US2021/033707, mailed Sep. 14, 2021, 16 Pages.
Foreign Communication From A Related Counterpart Communication, International Search Report and Written Opinion for International Application No. PCT/US2021/033712, mailed Aug. 16, 2021, 13 Pages.
Foreign Communication From A Related Counterpart Communication, International Search Report and Written Opinior for International Application No. PCT/US2021/033717, mailed Aug. 24, 2021, 15 Pages.
Foreign Communication From A Related Counterpart Communication, International Search Report and Written Opinior for International Application No. PCT/US2021/036471, mailed Sep. 1, 2021, 28 Pages.
Schwarz et al., "Overview of the scalable video coding extension of the H. 264/AVC standard", IEEE Transactions on circuits and systems for video technology, vol. 17.9, doi:10.1109/TCSVT.2007.905532, (Sep. 24, 2007), pages 1103-1120, (Feb. 18, 2021), XP055289615, Retrieved on May 16, 2021 (May 16, 2021) from https://ieeexplore.ieee.org/abstract/ document/4317636 entire document.
Wenger S., et al. "RTP Payload Format For H. 264/SVC Scalable Video Coding," Journal of Zhejiang University Science A, Feb. 25, 2006, pp. 657-667 (12 Pages).
Written Decision on Registration for Korean Application No. 10-2022-7044041, mailed Oct. 8, 2024, 4 pages.
Chinese Office Action from Chinese Patent Application No. 2021800372801 dated Mar. 17, 2025, 41 pages.
Chinese Office Action from Chinese Patent Application No. 2021800372765 dated Apr. 16, 2025, 12 pages.

* cited by examiner

Performing a conversion between a video comprising one or more pictures and a bitstream of the video, the bitstream conforming to a format rule that specifies that a flag and a syntax element, when included in the bitstream, are access unit (AU) specific, the flag indicating, in response to a current AU not being a first AU in the bitstream in a decoding order, whether a nominal coded picture buffer (CPB) removal time of the current AU is determined relative to (a) a nominal CPB removal time of a previous AU associated with a buffering period supplemental enhancement information (SEI) message or (b) a nominal CPB removal time of the current AU, and the syntax element specifying, in response to a current AU not being a first AU in the bitstream in a decoding order, a CPB removal delay increment value relative to the nominal CPB removal time of the current AU

CODING OF PICTURE ORDER COUNT IN VIDEO BITSTREAMS

CROSS-REFERENCE TO RELATED APPLICATIONS

This application is a continuation of International Patent Application No. PCT/US2021/033780, filed on May 21, 2021 which claims the priority to and benefits of U.S. Provisional Patent Application No. 63/029,321 filed on May 22, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders to perform video encoding or decoding.

In an example aspect, a video processing method is disclosed. The method includes performing a conversion between a video comprising one or more pictures and a bitstream of the video, wherein the bitstream conforms to a format rule, wherein the format rule specifies that a picture timing (PT) supplemental enhancement information (SEI) message, when included in the bitstream, is access unit (AU) specific, and wherein each picture of the one or more pictures that is a random access skipped leading (RASL) picture includes only a RASL network abstraction layer unit type (NUT).

In another example aspect, another video processing method is disclosed. The method includes performing a conversion between a video comprising one or more pictures and a bitstream of the video, wherein the bitstream conforms to a format rule, wherein the format rule permits a use of a random access decodable leading (RADL) subpicture in a random access skipped leading (RASL) picture as a reference subpicture for predicting a collocated RADL picture in a RADL picture associated with a same clean random access (CRA) picture as the RASL picture.

In yet another example aspect, another video processing method is disclosed. The method includes performing a conversion between a video comprising one or more pictures and a bitstream of the video, wherein the bitstream conforms to a format rule, wherein the format rule specifies that a derivation of a picture associated with a first flag and in a decoding process for a picture order count is based on a second flag, wherein the picture associated with the first flag is a previous picture in a decoding order that has (i) a first identifier same as a slice or picture header referring to a reference picture list syntax structure, (ii) a second identifier and the second flag being equal to zero, and (iii) a picture type different from a random access skipped leading (RASL) picture and a random access decodable leading (RADL) picture, wherein the first flag indicates whether a third flag is present in the bitstream, wherein the second flag indicates whether a current picture is used as a reference picture, and wherein the third flag is used to determine a value of one or more most significant bits of a picture order count value of a long-term reference picture.

In yet another example aspect, another video processing method is disclosed. The method includes performing a conversion between a video comprising one or more pictures and a bitstream of the video, wherein the bitstream conforms to a format rule, wherein the format rule specifies that a variable, which is used to determine a timing of a removal of a decoding unit (DU) or decoding the DU, is access unit (AU) specific and derived based on a flag that indicates whether a current picture is allowed to be used as a reference picture.

In yet another example aspect, another video processing method is disclosed. The method includes performing a conversion between a video comprising one or more pictures and a bitstream of the video, wherein the bitstream conforms to a format rule, wherein the format rule specifies that a buffering period supplemental enhancement information (SEI) message and a picture timing SEI message, when included in the bitstream, are access unit (AU) specific, wherein a first variable associated with the buffering period SEI message and a second variable associated with the buffering period SEI message and the picture timing SEI message are derived based on a flag that indicates whether a current picture is allowed to be used as a reference picture, wherein the first variable is indicative of an access unit comprising (i) an identifier that is equal to zero and (ii) a picture that is not a random access skipped leading (RASL) picture or a random access decodable leading (RADL) picture and for which the flag is equal to zero, and wherein the second variable is indicative of a current AU not being a first AU in a decoding order and a previous AU in the decoding order comprising (i) the identifier that is equal to zero and (ii) a picture that is not a random access skipped leading (RASL) picture or a random access decodable leading (RADL) picture and for which the flag is equal to zero.

In yet another example aspect, another video processing method is disclosed. The method includes performing a conversion between a video comprising one or more pictures and a bitstream of the video, wherein the bitstream conforms to a format rule, wherein the format rule specifies that a derivation of a first variable and a second variable associated with a first picture and a second picture is based on a flag, wherein the first picture is a current picture and the second picture is a previous picture in a decoding order that (i) comprises a first identifier that is equal to zero, (ii) comprises a flag that is equal to zero, and (iii) is not a random access skipped leading (RASL) picture or a random access decodable leading (RADL) picture, and wherein the first variable and the second variable are a maximum value and a minimum value, respectively, of a picture order count of each of the following pictures with a second identifier that is equal to that of the first picture (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture.

In yet another example aspect, another video processing method is disclosed. The method includes performing a conversion between a video comprising one or more pictures and a bitstream of the video, wherein the bitstream conforms to a format rule, wherein the format rule specifies that a flag and a syntax element, when included in the bitstream, are access unit (AU) specific, wherein the flag indicates, in response to a current AU not being a first AU in the bitstream in a decoding order, whether a nominal coded picture buffer (CPB) removal time of the current AU is determined relative to (a) a nominal CPB removal time of a previous AU associated with a buffering period supplemental enhancement information (SEI) message or (b) a nominal CPB removal time of the current AU, and wherein the syntax element specifies, in response to a current AU not being a first AU in the bitstream in a decoding order, a CPB removal delay increment value relative to the nominal CPB removal time of the current AU.

In yet another example aspect, another video processing method is disclosed. The method includes performing a conversion between a video comprising one or more pictures and a bitstream of the video, wherein the bitstream conforms to a format rule, wherein the format rule specifies that a plurality of variables and a picture timing supplemental enhancement information (SEI) message, when included in the bitstream, are access unit (AU) specific, wherein the picture timing SEI message comprises a plurality of syntax elements, wherein a first variable of the plurality of variables indicates whether a current AU is associated with a buffering period SEI message, wherein a second variable and a third variable of the plurality of variables are associated with an indication of whether the current AU is an AU that initializes a hypothetical reference decoder (HRD), wherein a first syntax element of the plurality of syntax elements specifies a number of clock ticks to wait after a removal of an AU from a coded picture buffer (CPB) before one or more decoded pictures of the AU are output from the decoded picture buffer (DPB), wherein a second syntax element of the plurality of syntax elements specifies a number of sub clock ticks to wait after a removal of a last decoding unit (DU) in an AU from the CPB before the one or more decoded pictures of the AU are output from the DPB, and wherein a third syntax element of the plurality of syntax elements specifies a number of elemental picture period intervals that one or more decoded pictures of the current AU occupy for a display model.

In yet another example aspect, another video processing method is disclosed. The method includes performing a conversion between a video comprising one or more pictures and a bitstream of the video, wherein the bitstream conforms to a format rule, wherein the format rule specifies that a syntax element associated with a decoding picture buffer (DPB), when included in the bitstream, is access unit (AU) specific, and wherein the syntax element specifies a number of sub clock ticks to wait after removal of a last decoding unit (DU) in an AU from the coded picture buffer (CPB) before one or more decoded pictures of the AU are output from the DPB.

In yet another example aspect, another video processing method is disclosed. The method includes performing a conversion between a video comprising one or more pictures and a bitstream of the video, wherein the bitstream conforms to a format rule, wherein the format rule specifies that a flag, when included in the bitstream, is access unit (AU) specific, wherein the value of the flag is based on whether an associated AU is an intra random access points (IRAP) AU or a gradual decoding refresh (GDR) AU, and wherein the value of the flag specifies (i) whether a syntax element is present in a buffering period supplemental enhancement information (SEI) message and (ii) whether alternative timing information is present in a picture timing SEI message in a current buffering period.

In yet another example aspect, another video processing method is disclosed. The method includes performing a conversion between a video comprising one or more pictures and a bitstream of the video, wherein the bitstream conforms to a format rule, wherein the format rule specifies that a value of a first syntax element is based on a flag that indicates whether a temporal distance between output times of consecutive pictures of a hypothetical reference decoder (HRD) is constrained and a variable that identifies a highest temporal sublayer to be decoded, and wherein the first syntax element specifies a number of elemental picture period intervals that one or more decoded pictures of the current AU occupy for a display model.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

BRIEF DESCRIPTION OF DRAWINGS

FIGS. 6-16 show flowcharts for example methods of video processing.

DETAILED DESCRIPTION

Figure 1:
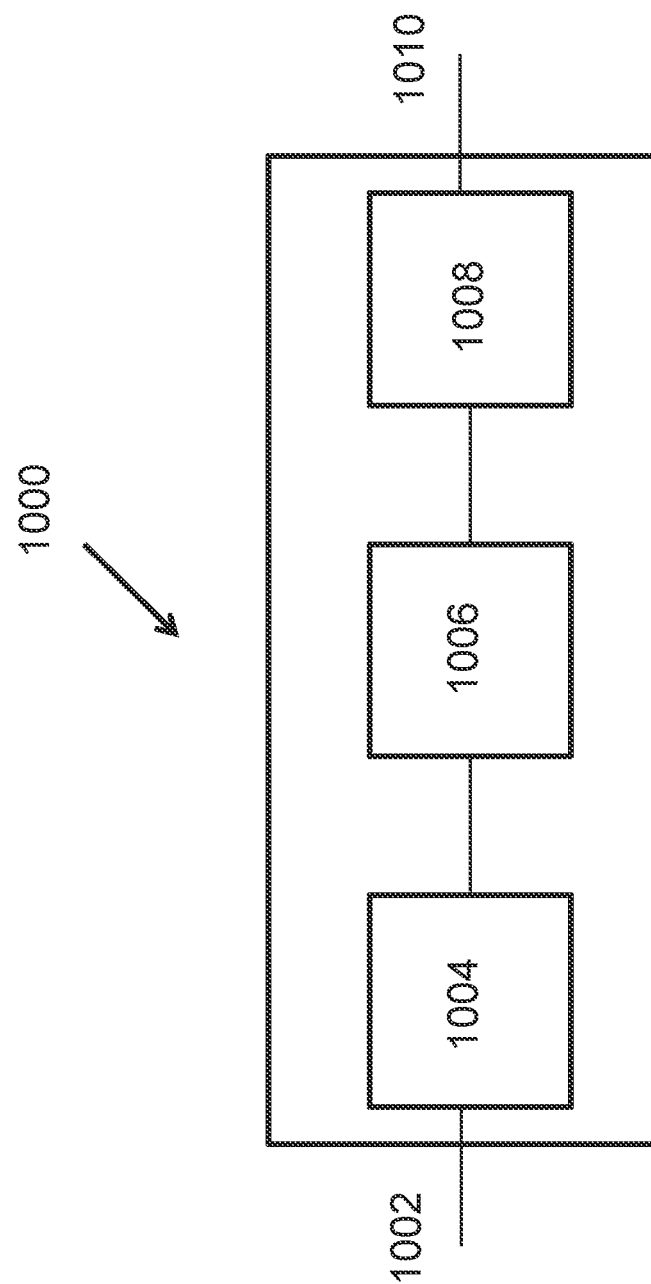
FIG. 1 is a block diagram showing an example video processing system in which various embodiments disclosed herein may be implemented.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. INTRODUCTION

This disclosure is related to video coding technologies. Specifically, it is about handling of discardable pictures/access units (AUs) and semantics of hypothetical reference decoder (HRD)-related SEI messages in video coding. Examples of discardable pictures that can be discarded in certain scenarios include random access skipped leading (RASL) pictures, random access decodable leading (RADL) pictures, and pictures with ph_non_ref_pic_flag equal to 1. HRD related SEI messages include buffering period (BP), picture timing (PT), and decoding unit information (DUI) SEI messages. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Points
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RADL Random Access Decodable Leading Picture
RASL Random Access Skipped Leading Picture
RBSP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signalling of the DPB status, instead of an "inter-coded" signalling as in AVC, mainly for improved error resilience. The RPLC process in HEVC is based on the RPS, by signalling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signalled more directly. Reference pictures are listed for the RPLs as either active and inactive entries, and only the active entries may be used as reference indices in inter prediction of CTUs of the current picture.

Inactive entries indicate other pictures to be held in the DPB for referencing by other pictures that arrive later in the bitstream.

3.2. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signalling of intra random access points (IRAP) pictures in the NAL unit header, through NAL unit types. Three types of IRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of IRAP pictures, altogether six different NAL units are defined to signal the properties of the IRAP pictures, which can be used to better match the stream access point types as defined in the ISO base media file format (ISOBMFF), which are utilized for random access support in dynamic adaptive streaming over HTTP (DASH).

VVC supports three types of IRAP pictures, two types of IDR pictures (one type with or the other type without associated RADL pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signalling of GDR random access points and the recovery points. In VVC, a new NAL unit type is specified for indication of GDR pictures and the recovery point is signalled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signalling. The boundary between the refreshed region (i.e., the correctly decoded region) and the unrefreshed region at a picture between a GDR picture and its recovery point can be signalled as a virtual boundary, and when signalled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.3. Picture Resolution Change within a Sequence

In AVC and HEVC, the spatial resolution of pictures cannot change unless a new sequence using a new SPS starts, with an intra random access points (IRAP) picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) the picture resolution and the corresponding conformance window are signalled in the PPS instead of in the SPS, while in the SPS the maximum picture resolution is signalled; and ii) for a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams is specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an IRAP AU is required to contain a picture for each of the layers present in the CVS.

3.5. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. TECHNICAL PROBLEMS SOLVED BY THE DISCLOSED TECHNICAL SOLUTIONS

The existing designs for handling of discardable pictures and AUs in the latest VVC text (in JVET-R2001-vA/v10) have the following problems:
1) In clause 3 (Definitions), as part of the definition of RASL picture, there is an issue with the sentence "RASL pictures are not used as reference pictures for the decoding process of non-RASL pictures," because that is no longer true in some scenarios, thus it would cause confusion and interoperability problems.
2) In clause D.4.2 (Picture timing SEI message semantics), the constraint on pt_cpb_alt_timing_info_present_flag being equal to 0 is specified in a picture-specific manner. However, as HRD operations are OLS-based, the semantics are technically incorrect and can cause interoperability problems.
3) The derivation of prevTid0Pic in the semantics of delta_poc_msb_cycle_present_flag[i][j] and in the decoding process for picture order count (POC) does not take into account the value of ph_non_ref_pic_flag. This would cause problems when pictures with ph_non_ref_pic_flag equal to 1 are discarded, as then the derived POC values for pictures and/or the signalled reference pictures can be wrong, and unexpected incorrect decoding behaviors, including decoder crash, can occur.
4) In clause C.2.3 (Timing of DU removal and decoding of DU), the variable prevNonDiscardablePic is specified in a picture-specific manner, and the value of ph_non_ref_pic_flag is not taken into account. Consequently, similar problems as above can occur.
5) Similar issues as in problem 4 apply for notDiscardablePic and prevNonDiscardablePic in clause D.3.2 (Buffering period SEI message semantics) and prevNonDiscardablePic in clause D.4.2 (Picture timing SEI message semantics).
6) The semantics of bp_concatenation_flag and bp_cpb_removal_delay_delta_minus1 are specified in a picture-specific manner. However, as HRD operations are OLS-based, the semantics are technically incorrect and can cause interoperability problems.
7) In the constraint on the value of bp_alt_cpb_params_present_flag, in the semantics of bp_alt_cpb_params_present_flag, has two issues: first, it is specified in a picture-specific manner while it should be AU-specific, and second, only IRAP pictures are considered, while GDR pictures also need to be considered.

8) The variables BpResetFlag, CpbRemovalDelayMsb[i] and CpbRemovalDelayVal[i], and the semantics of the syntax elements pt_dpb_output_delay, pt_dpb_output_du_delay and pt_display_elemental_periods_minus1, in clause D.4.2 (Picture timing SEI message semantics), are specified in a picture-specific manner. However, as HRD operations are OLS-based, the semantics are technically incorrect and can cause interoperability problems.
9) In clause C.4 (Bitstream conformance), the derivation of maxPicOrderCnt and minPicOrderCnt does not take into account the value of ph_non_ref_pic_flag. This would cause problems when pictures with ph_non_ref_pic_flag equal to 1 are discarded, as then the derived POC values for pictures and/or the signalled reference pictures can be wrong, and unexpected incorrect decoding behaviors, including decoder crash, can occur.
10) In the semantics of pt_display_elemental_periods_minus1, the syntax element fixed_pic_rate_within_cvs_flag[TemporalId] is used. However, since the semantics should be described in the context of a target highest TemporalId value, like in other semantics of BP, PT, and DUI SEI messages, fixed_pic_rate_within_cvs_flag[Htid] should be used instead.
11) The semantics of dui_dpb_output_du_delay are specified in a picture-specific manner. However, as HRD operations are OLS-based, the semantics are technically incorrect and can cause interoperability problems.

5. A LISTING OF TECHNICAL SOLUTIONS AND EMBODIMENTS

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, in clause 3 (Definitions), change the sentence "RASL pictures are not used as reference pictures for the decoding process of non-RASL pictures," in the NOTE as part of the RASL picture definition to "RASL pictures are not used as reference pictures for the decoding process of non-RASL pictures, except that a RADL subpicture, when present, in a RASL picture may be used for inter prediction of the collocated RADL subpicture in a RADL picture that is associated with the same CRA picture as the RASL picture."
2) To solve problem 2, in clause D.4.2 (Picture timing SEI message semantics), change the description of the constraint on pt_cpb_alt_timing_info_present_flag being equal to 0 from picture-specific to AU-specific, and add that the RASL pictures herein contain only RASL NUTs.
   a. In one example, the constraint is specified as follows: When all pictures in the associated AU are RASL pictures with pps_mixed_nalu_types_in_pic_flag equal to 0, the value of pt_cpb_alt_timing_info_present_flag shall be equal to 0.
   b. In another example, the constraint is specified as follows: When all pictures in the associated AU are RASL pictures for which pps_mixed_nalu_types_in_pic_flag is equal to 0, the value of pt_cpb_alt_timing_info_present_flag shall be equal to 0.
   c. In yet another example, the constraint is specified as follows: When all pictures in the associated AU are RASL pictures containing VCL NAL units all with nal_unit_type equal to RASL_NUT, the value of pt_cpb_alt_timing_info_present_flag shall be equal to 0.
3) To solve problem 3, add ph_non_ref_pic_flag to the derivation of prevTid0Pic in the semantics of delta_poc_msb_cycle_present_flag[i][j] and in the decoding process for picture order count.
4) To solve problem 4, in clause C.2.3 (Timing of DU removal and decoding of DU), change the specification of prevNonDiscardablePic from picture-specific to AU-specific, including renaming it to prevNonDiscardableAu, add ph_non_ref_pic_flag to the derivation of the same variable.
5) To solve problem 5, for notDiscardablePic and prevNonDiscardablePic in clause D.3.2 (Buffering period SEI message semantics) and prevNonDiscardablePic in clause D.4.2 (Picture timing SEI message semantics), change the specification of these variables from picture-specific to AU-specific, including renaming them to notDiscardableAu and prevNonDiscardableAu, respectively, and add ph_non_ref_pic_flag to the derivation of these two variables.
6) To solve problem 6, change the description of the semantics of bp_concatenation_flag and bp_cpb_removal_delay_delta_minus1 from picture-specific to AU-specific.
7) To solve problem 7, the constraint on the value of bp_alt_cpb_params_present_flag is specified in an AU-specific manner, and it is specified that the value of bp_alt_cpb_params_present_flag depends additionally on whether the associated AU is a GDR AU.
8) To solve problem 8, change the specification of the variables BpResetFlag, CpbRemovalDelayMsb[i] and CpbRemovalDelayVal[i] and the semantics of the syntax elements pt_dpb_output_delay, pt_dpb_output_du_delay and pt_display_elemental_periods_minus1 in clause D.4.2 (Picture timing SEI message semantics) from picture-specific to AU-specific.
9) To solve problem 9, in clause C.4 (Bitstream conformance), add ph_non_ref_pic_flag to "The previous picture in decoding order that has TemporalId equal to 0 and is not a RASL or RADL picture" in the derivation of maxPicOrderCnt and minPicOrderCnt.
10) To solve problem 10, specify the semantics of pt_display_elemental_periods_minus1 using fixed_pic_rate_within_cvs_flag[Htid] instead of fixed_pic_rate_within_cvs_flag[TemporalId].
11) To solve problem 11, specify the semantics of dui_dpb_output_du_delay in an AU-specific manner.

6. EMBODIMENTS

Below are some example embodiments for some of the aspects summarized above in Section 5, which can be applied to the VVC specification. The changed texts are based on the latest VVC text in JVET-R2001-vA/v10. Most relevant parts that have been added or modified are bolded, underlined and italicized, e.g., "using A _and B_", and some of the deleted parts are italicized with strikethrough, e.g., "based on _A and_ B". There may be some other changes that are editorial in nature and thus not highlighted.

6.1. First Embodiment

This embodiment is for items 1 to 9.

3 Definitions

. . .

random access skipped leading (RASL) picture: A coded picture for which there is at least one VCL NAL unit with nal_unit_type equal to RASL_NUT and other VCL NAL units all have nal_unit_type equal to RASL_NUT or RADL_NUT.
NOTE—All RASL pictures are leading pictures of an associated CRA picture. When the associated CRA picture has NoOutputBeforeRecoveryFlag equal to 1, the RASL picture is not output and may not be correctly decodable, as the RASL picture may contain references to pictures that are not present in the bitstream. RASL pictures are not used as reference pictures for the decoding process of non-RASL pictures, *except that a RADL subpicture, when present, in a RASL picture may be used for inter prediction of the collocated RADL subpicture in a RADL picture that is assoicated with the same CRA picture as the RASL picture*. When sps-_field_seq_flag is equal to 0, all RASL pictures, when present, precede, in decoding order, all non-leading pictures of the same associated CRA picture.

. . .

7.4.9 Reference Picture Lists Semantics

. . .

delta_poc_msb_cycle_present_flag[i][j] equal to 1 specifies that delta_poc_msb_cycle_lt[i][j] is present. delta_poc_msb_cycle_present_flag[i][j] equal to 0 specifies that delta_poc_msb_cycle_lt[i][j] is not present.
Let prevTid0Pic be the previous picture in decoding order that has the same nuh_layer_id as the current picture, has TemporalId *and ph_non_ref_pic_flag both* equal to 0, and is not a RASL or RADL picture. Let setOfPrevPocVals be a set consisting of the following:
the PicOrderCntVal of prevTid0Pic,
the PicOrderCntVal of each picture that is referred to by entries in RefPicList[0] or RefPicList[1] of prevTid0Pic and has nuh_layer_id the same as the current picture,
the PicOrderCntVal of each picture that follows prevTid0Pic in decoding order, has nuh_layer_id the same as the current picture, and precedes the current picture in decoding order.
When there is more than one value in setOfPrevPocVals for which the value modulo MaxPicOrderCntLsb is equal to PocLsbLt[i][j], the value of delta_poc_msb_cycle_present_flag[i][j] shall be equal to 1.

. . .

8.3.1 Decoding Process for Picture Order Count

. . .

When ph_poc_msb_cycle_present_flag is equal to 0 and the current picture is not a CLVSS picture, the variables prevPicOrderCntLsb and prevPicOrderCntMsb are derived as follows:
Let prevTid0Pic be the previous picture in decoding order that has the same nuh_layer_id as the current picture, has TemporalId and *and ph_non_ref_pic_flag both* equal to 0, and is not a RASL or RADL picture.
The variable prevPicOrderCntLsb is set equal to ph_pic_order_cnt_lsb of prevTid0Pic.
The variable prevPicOrderCntMsb is set equal to PicOrderCntMsb of prevTid0Pic.

. . .

C.2.3 Timing of DU Removal and Decoding of DU

. . .

The nominal removal time of the AU n from the CPB is specified as follows:
If AU n is the AU with n equal to 0 (the AU that initializes the HRD), the nominal removal time of the AU from the CPB is specified by:

$$AuNominalRemovalTime[0] = InitCpbRemovalDelay[Htid][ScIdx] \div 90000 \qquad (C.9)$$

Otherwise, the following applies:
When AU n is the first AU of a BP that does not initialize the HRD, the following applies:
The nominal removal time of the AU n from the CPB is specified by:

```
if( !concatenationFlag ) {
    baseTime = AuNominalRemovalTime[ firstAuInPrevBuffPeriod ]
    tmpCpbRemovalDelay = AuCpbRemovalDelayVal
} else {
    baseTime1 = AuNominalRemovalTime prevNonDiscardableAu ]
    tmpCpbRemovalDelay1 = (auCpbRemovalDelayDeltaMinus1 + 1 )
    baseTime2 = AuNominalRemovalTime[ n - 1 ]
    tmpCpbRemovalDelay2 =                          (C.10)
            Ceil( ( InitCpbRemovalDelay[ Htid ] [ ScIdx ] ÷ 90000 +
    AuFinalArrivalTime[ n - 1 ] - AuNominalRemovalTime[ n - 1 ] ) ÷ ClockTick )
    if( baseTime1 + ClockTick * tmpCpbRemovalDelay1 <
                    baseTime2 + ClockTick * tmpCpbRemovalDelay2 ) {
        baseTime = baseTime2
        tmpCpbRemovalDelay = tmpCpbRemovalDelay2
    } else {
        baseTime = baseTime1
        tmpCpbRemovalDelay = tmpCpbRemovalDelay1
    }
}
```

AuNominalRemovalTime[*n*]=baseTime+
(ClockTick*tmpCpbRemovalDelay−CpbDelay−
Offset)

where AuNominalRemovalTime[first *Au* InPrevBuff-Period] is the nominal removal time of the first AU of the previous BP, AuNominalRemovalTime[prevNonDiscardable*Au*] is the nominal removal time of *the previous AU* in decoding order with TemporalId equal to 0 *that has at least one picture that has ph_non ref_pic_flag equal to 0* that is not a RASL or RADL picture, AuCpbRemovalDelayVal is the value of CpbRemovalDelayVal[Htid] derived according to pt_cpb_removal_delay_minus1 [Htid] and pt_cpb_removal_delay_delta_idx[Htid] in the PT SEI message, and bp_cpb_removal_delay_delta_val [pt_cpb_removal_delay_delta_idx[Htid]] in the BP SEI message, selected as specified in clause C.1, associated with AU n and concatenationFlag and CpbRemovalDelayDeltaMinus1 are the values of the syntax elements bp_concatenation_flag and bp_cpb_removal_delay_delta_minus1, respectively, in the BP SEI message, selected as specified in clause C.1, associated with AU n.

After the derivation of the nominal CPB removal time and before the derivation of the DPB output time of access unit n, the variables DpbDelayOffset and CpbDelayOffset are derived as:
If one or more of the following conditions are true, DpbDelayOffset is set equal to the value of the PT SEI message syntax element dpb_delay_offset[Htid] of AU n+1, and CpbDelayOffset is set equal to the value of the PT SEI message syntax element cpb_delay_offset[Htid] of AU n+1, where the PT SEI message containing the syntax elements is selected as specified in clause C.1:
UseAltCpbParamsFlag for AU n is equal to 1.
DefaultInitCpbParamsFlag is equal to 0.
Otherwise, DpbDelayOffset and CpbDelayOffset are both set equal to 0.

When AU n is not the first AU of a BP, the nominal removal time of the AU n from the CPB is specified by:

AuNominalRemovalTime[*n*]=AuNominalRemoval-
Time[first *Au* InCurrBuffPeriod]+ClockTick*
(AuCpbRemovalDelayVal−CpbDelayOffset)  (C.11)

where AuNominalRemovalTime[first *Au* InCurrBuff-Period] is the nominal removal time of the first AU of the current BP and AuCpbRemovalDelayVal is the value of CpbRemovalDelayVal[OpTid] derived according to pt_cpb_removal_delay_minus1[OpTid] and pt_cpb_removal_delay_delta_idx[OpTid] in the PT SEI message, and bp_cpb_removal_delay_delta_val[pt_cpb_removal_delay_delta_idx[OpTid]] in the BP SEI message, selected as specified in clause C.1, associated with AU n.

. . .

C.4 Bitstream Conformance
Let currPicLayerId be equal to the nuh_layer_id of the current picture.
For each current picture, let the variables maxPicOrderCnt and minPicOrderCnt be set equal to the maximum and the minimum, respectively, of the PicOrderCntVal values of the following pictures with nuh_layer_id equal to currPicLayerId:
The current picture.
The previous picture in decoding order that has TemporalId *and ph_non_ref_pic_flag both* equal to 0 and is not a RASL or RADL picture.
The STRPs referred to by all entries in RefPicList[0] and all entries in RefPicList[1] of the current picture.
All pictures n that have PictureOutputFlag equal to 1, AuCpbRemovalTime[n] less than AuCpbRemovalTime[currPic] and DpbOutputTime[n] greater than or equal to AuCpbRemovalTime[currPic], where currPic is the current picture.

. . .

D.3.2 Buffering Period SEI Message Semantics
. . .
When the BP SEI message is present, *an AU is said to be a notDiscardableAu when the AU* has TemporalId equal to 0 and *has at least one picture that has ph_non_ref_pic_flag is equal to 0* that is not a RASL or RADL picture.
When *the current AU is not the first AU* in the bitstream in decoding order, let *the AU prevNonDiscardableAu be the previous AU* in decoding order with TemporalId equal to 0 *that has at least one picture that has ph_ non_ref_pic_flag equal to 0* that is not a RASL or RADL picture.
The presence of BP SEI messages is specified as follows:
If NalHrdBpPresentFlag is equal to 1 or VclHrdBpPresentFlag is equal to 1, the following applies for each AU in the CVS:
If the AU is an IRAP or GDR AU, a BP SEI message applicable to the operation point shall be associated with the AU.
Otherwise, if the AU *is a notDiscardableAu,* a BP SEI message applicable to the operation point may or may not be associated with the AU.
Otherwise, the AU shall not be associated with a BP SEI message applicable to the operation point.
Otherwise (NalHrdBpPresentFlag and VclHrdBpPresentFlag are both equal to 0), no AU in the CVS shall be associated with a BP SEI message.
NOTE 1—For some applications, frequent presence of BP SEI messages may be desirable (e.g., for random access at *an IRAP AU or a non-IRAP AU* or for bitstream splicing).

. . .

bp_alt_cpb_params_present_flag equal to 1 specifies the presence of the syntax element bp_use_alt_cpb_params_flag in the BP SEI message and the presence of the alternative timing information in the PT SEI messages in the current BP. When not present, the value of bp_alt_cpb_params_present_flag is inferred to be equal to 0. When *the associated AU is not an IRAP or GDR AU,* the value of bp_alt_cpb_params_present_flag shall be equal to 0.

. . .

bp_concatenation_flag indicates, when *the current AU is not the first AU* in the bitstream in decoding order, whether the nominal CPB removal time of *the current AU* is determined relative to the nominal CPB removal time of the *previous AU associated* with a BP SEI message or relative to the nominal CPB removal time of *the AU prevNonDiscardableAu.* .

. . .

bp_cpb_removal_delay_delta_minus1 plus 1, when *the current AU is not the first AU* in the bitstream in decoding order, specifies a CPB removal delay increment value relative to the nominal CPB removal time of *the AU prevNonDiscardableAu.* The length of this syntax element is bp_cpb_removal_delay_length_minus1+1 bits. When *the current AU is associated with* a BP SEI message and bp_concatenation_flag is equal to 0 and *the current AU is not the first AU* in the bitstream in decoding order, it is a requirement of bitstream conformance that the following constraint applies:

If *the AU prevNonDiscardableAu* is not associated with a BP SEI message, the pt_cpb_removal_delay_minus1 of *the current AU* shall be equal to the pt_cpb_removal_delay_minus1 of *the AU prevNonDiscardableAu* plus bp_cpb_removal_delay_delta_minus1+1.

Otherwise, the pt_cpb_removal_delay_minus1 *of the current AU* shall be equal to bp_cpb_removal_delay_delta_minus1.

NOTE 2—When *the current AU is associated with* a BP SEI message and bp_concatenation_flag is equal to 1, the pt_cpb_removal_delay_minus1 for *the current AU* is not used. The above-specified constraint can, under some circumstances, make it possible to splice bitstreams (that use suitably-designed referencing structures) by simply changing the value of bp_concatenation_flag from 0 to 1 in the BP SEI message for *an IRAP or GDR AU* at the splicing point. When bp_concatenation_flag is equal to 0, the above-specified constraint enables the decoder to check whether the constraint is satisfied as a way to detect the loss of *the AU prevNonDiscardableAu.* .

. . .

D.4.2 Picture Timing SEI Message Semantics

. . .

pt_cpb_alt_timing_info_present_flag equal to 1 specifies that the syntax elements pt_nal_cpb_alt_initial_removal_delay_delta[i][j], pt_nal_cpb_alt_initial_removal_offset_delta[i][j], pt_nal_cpb_delay_offset[i], pt_nal_dpb_delay_offset[i], pt_vcl_cpb_alt_initial_removal_delay_delta[i][j], pt_vcl_cpb_alt_initial_removal_offset_delta[i][j], pt_vcl_cpb_delay_offset[i], and pt_vcl_dpb_delay_offset[i] may be present in the PT SEI message. pt_cpb_alt_timing_info_present_flag equal to 0 specifies that these syntax elements are not present in the PT SEI message. When *all pictures in the associated AU are RASL pictures with pps_mixed_nalu_types_in_pic_flag equal to 0*, the value of pt_cpb_alt_timing_info_present_flag shall be equal to 0.

NOTE 1—The value of pt_cpb_alt_timing_info_present_flag might be equal to 1 for more than one AU following an *IRAP AU* in decoding order. However, the alternative timing is only applied to the first AU that has pt_cpb_alt_timing_info_present_flag equal to 1 and follows the *IRAP AU* in decoding order.

. . .

pt_vcl_dpb_delay_offset[i] specifies, for the i-th sublayer for the VCL HRD, an offset to be used in the derivation of the DPB output times of the IRAP AU associated with the BP SEI message when the AU associated with the PT SEI message directly follows in decoding order the IRAP AU associated with the BP SEI message. The length of pt_vcl_dpb_delay_offset[i] is bp_dpb_output_delay_length_minus1+1 bits. When not present, the value of pt_vcl_dpb_delay_offset[i] is inferred to be equal to 0.

The variable BpResetFlag of the *the current AU* is derived as follows:

If *the current AU* is associated with a BP SEI message, BpResetFlag is set equal to 1.

Otherwise, BpResetFlag is set equal to 0.

. . .

pt_cpb_removal_delay_delta_idx[i] specifies the index of the CPB removal delta that applies to Htid equal to i in the list of bp_cpb_removal_delay_delta_val[j] for j ranging from 0 to bp_num_cpb_removal_delay_deltas_minus1, inclusive. The length of pt_cpb_removal_delay_delta_idx[i] is Ceil(Log 2(bp_num_cpb_removal_delay_deltas_minus1+1)) bits. When pt_cpb_removal_delay_delta_idx[i] is not present and pt_cpb_removal_delay_delta_enabled_flag[i] is equal to 1, the value of pt_cpb_removal_delay_delta_idx[i] is inferred to be equal to 0.

The variables CpbRemovalDelayMsb[i] and CpbRemovalDelayVal[i] of *the current AU* are derived as follows:

If the current AU is the AU that initializes the HRD, CpbRemovalDelayMsb[i] and CpbRemovalDelayVal[i] are both set equal to 0, and the value of cpbRemovalDelayValTmp[i] is set equal to pt_cpb_removal_delay_minus1[i]+1.

Otherwise, let *the AU prevNonDiscardableAu be the previous AU* in decoding order *with* TemporalId equal to 0 *that has at least one picture that has ph_non_ref_pic_flag equal to 0* that is not a RASL or RADL picture, let prevCpbRemovalDelayMinus1[i], prevCpbRemovalDelayMsb[i], and prevBpResetFlag be set equal to the values of cpbRemovalDelayValTmp[i]−1, CpbRemovalDelayMsb[i], and BpResetFlag, respectively, for *the AU prevNonDiscardableAU,*, and the following applies:

. . .

pt_dpb_output_delay is used to compute the DPB output time of *the AU* . It specifies how many clock ticks to wait after removal of an AU from the CPB before *the decoded pictures of the AU are* output from the DPB.

NOTE 2—A decoded picture is not removed from the DPB at its output time when it is still marked as "used for short-term reference" or "used for long-term reference".

The length of pt_dpb_output_delay is bp_dpb_output_delay_length_minus1+1 bits. When max_dec_pic_buffering_minus1[Htid] is equal to 0, the value of pt_dpb_output_delay shall be equal to 0. The output time derived from the pt_dpb_output_delay of any picture that is output from an output timing conforming decoder shall precede the output time derived from the pt_dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, *a CVSS AU* that has ph_no_output_of_prior_pics_flag equal to 1 or inferred to be equal to 1, the output times derived from pt_dpb_output_delay shall be increasing with increasing value of PicOrderCntVal relative to all pictures within the same CVS.

pt_dpb_output_du_delay is used to compute the DPB output time of *the AU* when DecodingUnitHrdFlag is equal to 1. It specifies how many sub clock ticks to wait after removal of the last DU in an AU from the CPB before *the decoded pictures of the AU are* output from the DPB.

. . .

pt_display_elemental_periods_minus1 plus 1, when sps_field_seq_flag is equal to 0 and fixed_pic_rate_within_cvs_flag[*Htid* ~~TemporalId~~ ] is equal to 1, indicates the number of elemental picture period intervals that *the decoded pictures of the current AU* occupies for the display model.

When fixed_pic_rate_within_cvs_flag[*Htid* ~~TemporalId~~ ] is equal to 0 or sps_field_seq_flag is equal to 1, the value of pt_display_elemental_periods_minus1 shall be equal to 0. When sps_field_seq_flag is equal to 0 and fixed_pic_rate_within_cvs_flag[*Htid* ~~TemporalId~~ ] is equal to 1, a value of pt_display_elemental_periods_minus1 greater than 0 may be used to indicate a frame repetition period for displays that use a fixed frame refresh interval equal to DpbOutputElementalInterval[n] as given by Equation 112.

. . .

D.5.2 DU Information SEI Message Semantics

. . .

dui_dpb_output_du_delay is used to compute the DPB output time of *the AU* when DecodingUnitHrdFlag is equal to 1 and bp_du_dpb_params_in_pic_timing_sei_flag is equal to 0. It specifies how many sub clock ticks to wait after removal of the last DU in an AU from the CPB before *the decoded pictures of the AU are* output from the DPB. When not present, the value of dui_dpb_output_du_delay is inferred to be equal to pt_dpb_output_du_delay. The length of the syntax element dui_dpb_output_du_delay is given in bits by bp_dpb_output_delay_du_length_minus1+1.

It is a requirement of bitstream conformance that all DU information SEI messages that are associated with the same AU, apply to the same operation point, and have bp_du_dpb_params_in_pic_timing_sei_flag equal to 0 shall have the same value of dui_dpb_output_du_delay.

The output time derived from the dui_dpb_output_du_delay of any picture that is output from an output timing conforming decoder shall precede the output time derived from the dui_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a *CVSS* ~~CVSS~~ *AU* that has ph_no_output_of_prior_pics_flag equal to 1 or inferred to be equal to 1, the output times derived from dui_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

. . .

FIG. 1 is a block diagram showing an example video processing system 1000 in which various embodiments disclosed herein may be implemented. Various implementations may include some or all of the components of the system 1000. The system 1000 may include input 1002 for receiving video content. The video content may be received in a raw or uncompressed format, e.g., 8- or 10-bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present disclosure. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
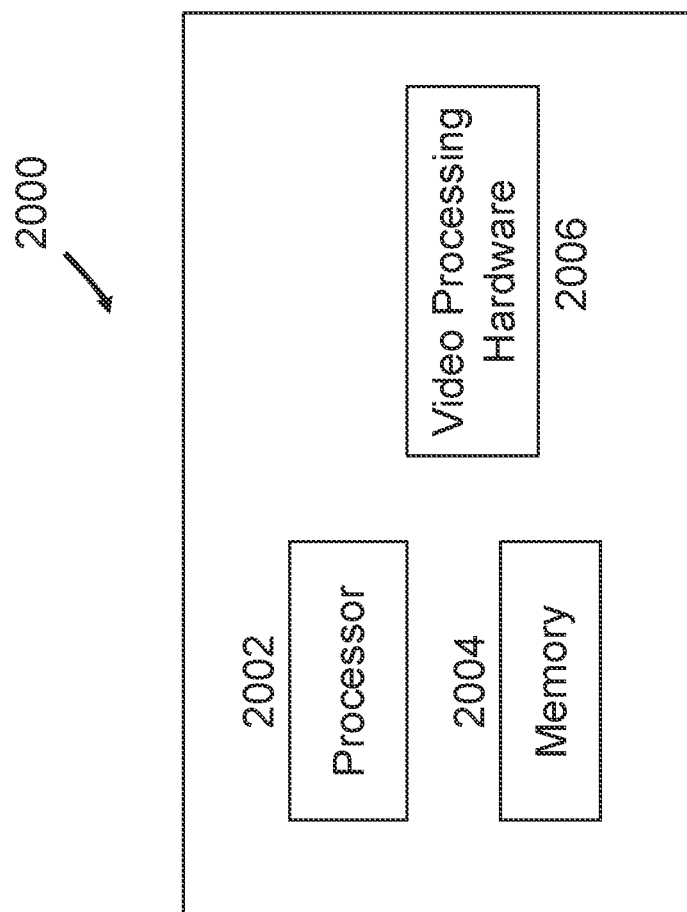
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present disclosure (e.g., in FIGS. 6-9). The memory (memories) 2004 may be used for storing data and code used for implementing the methods and embodiments described herein. The video processing hardware 2006 may be used to implement, in hardware circuitry, some embodiments described in the present disclosure. In some embodiments, the hardware 2006 may be partly or entirely in the one or more processors 2002, e.g., a graphics processor.

Figure 3:
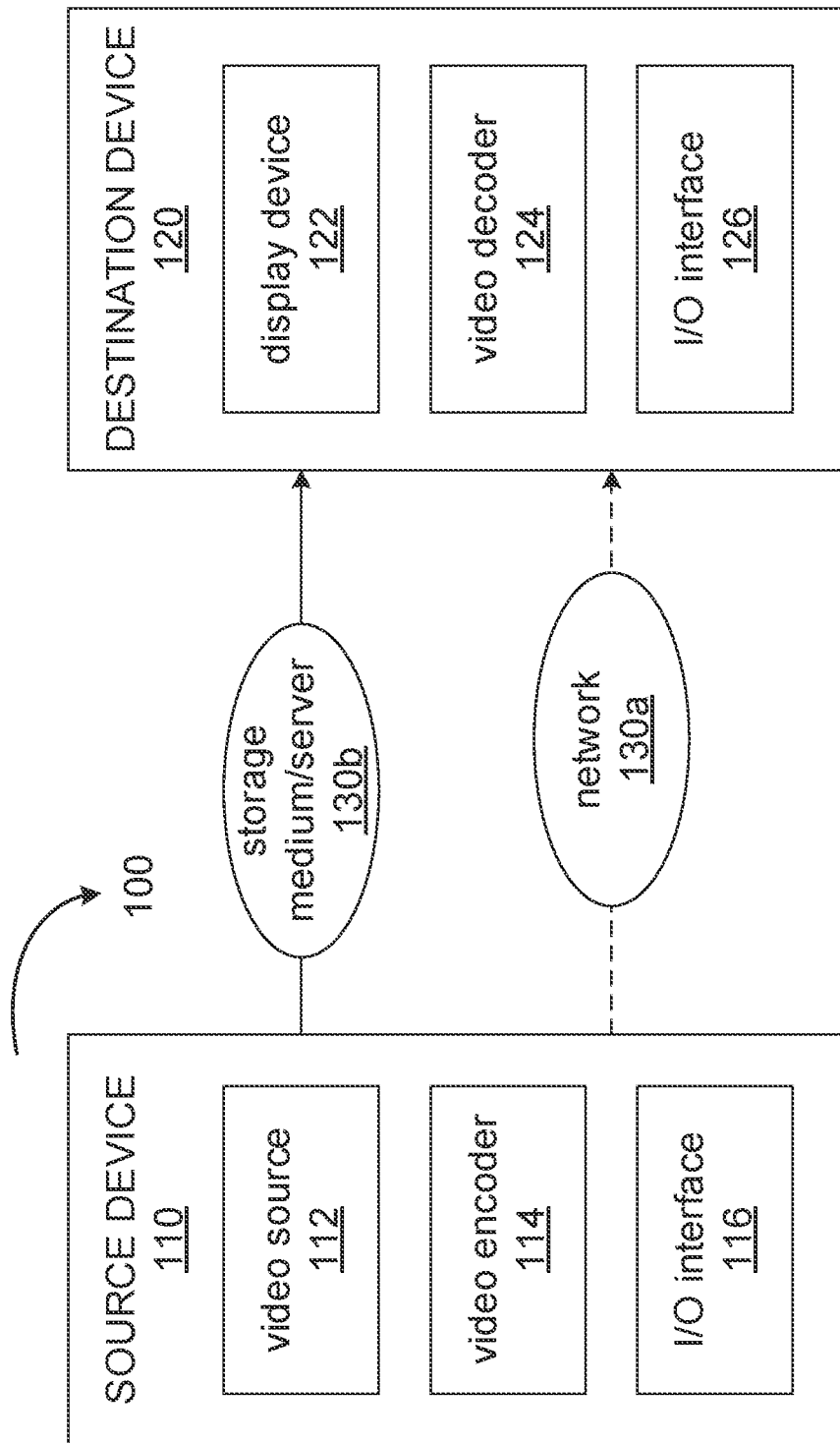
FIG. 3 is a block diagram that illustrates an example video coding system that can implement some embodiments of the present disclosure.

FIG. 3 is a block diagram that illustrates an example video coding system 100 that may utilize the embodiments of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 4:
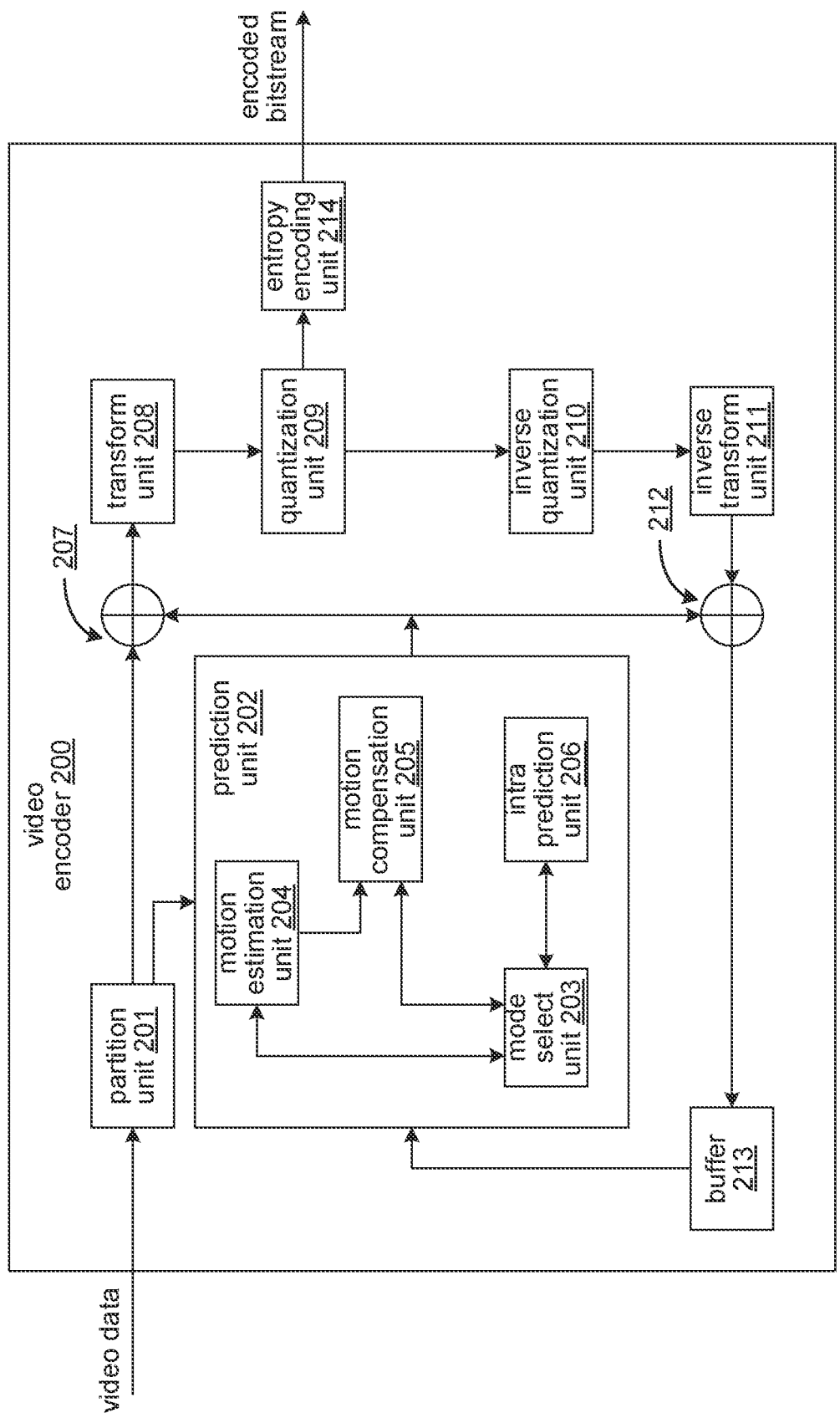
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the embodiments of this disclosure. In the example of FIG. 4, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
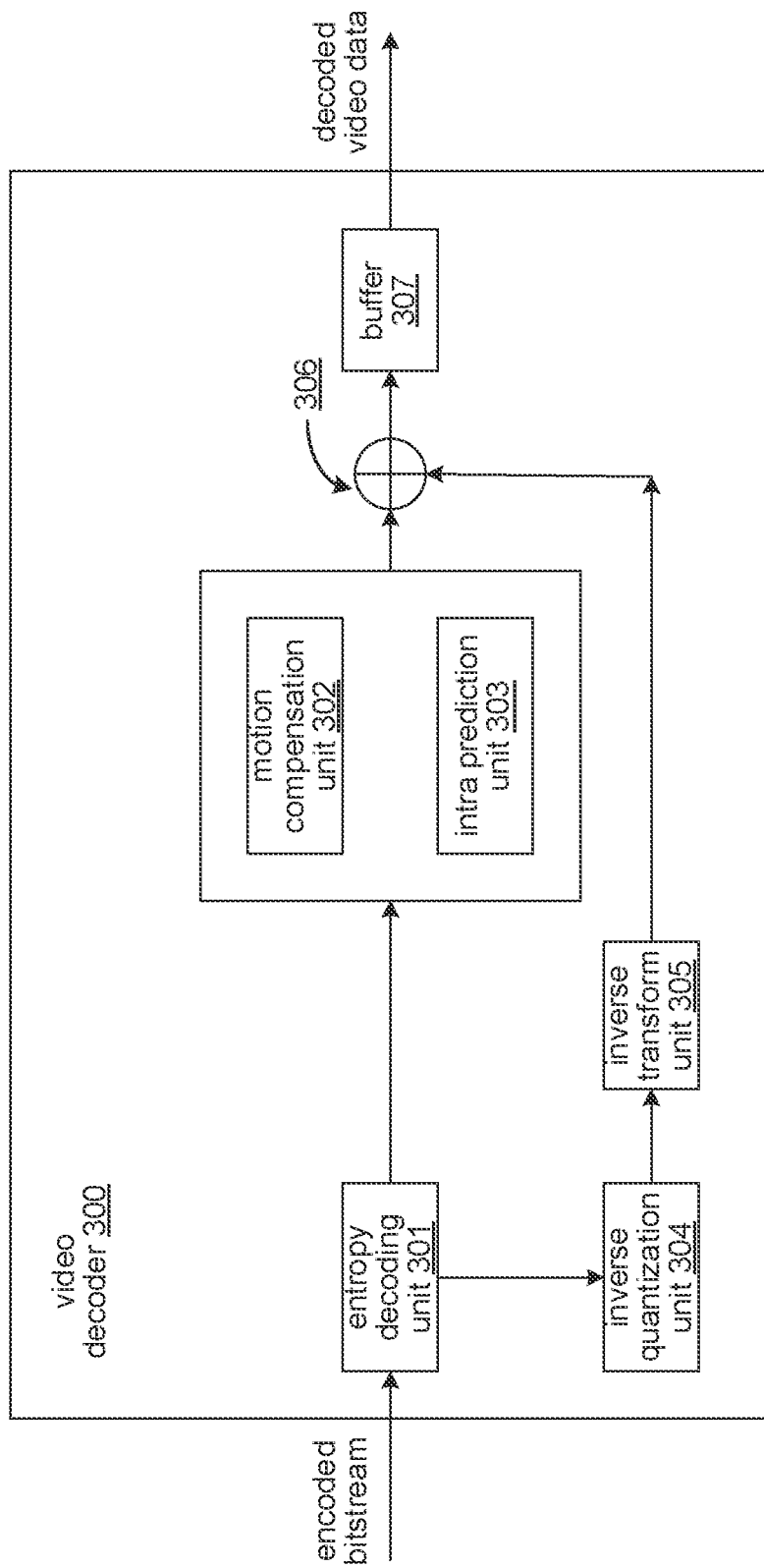
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the embodiments of this disclosure. In the example of FIG. 5, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 5, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

FIGS. 6-16 show example methods that can implement the embodiments described above in, for example, the embodiments shown in FIGS. 1-5.

Figure 6:
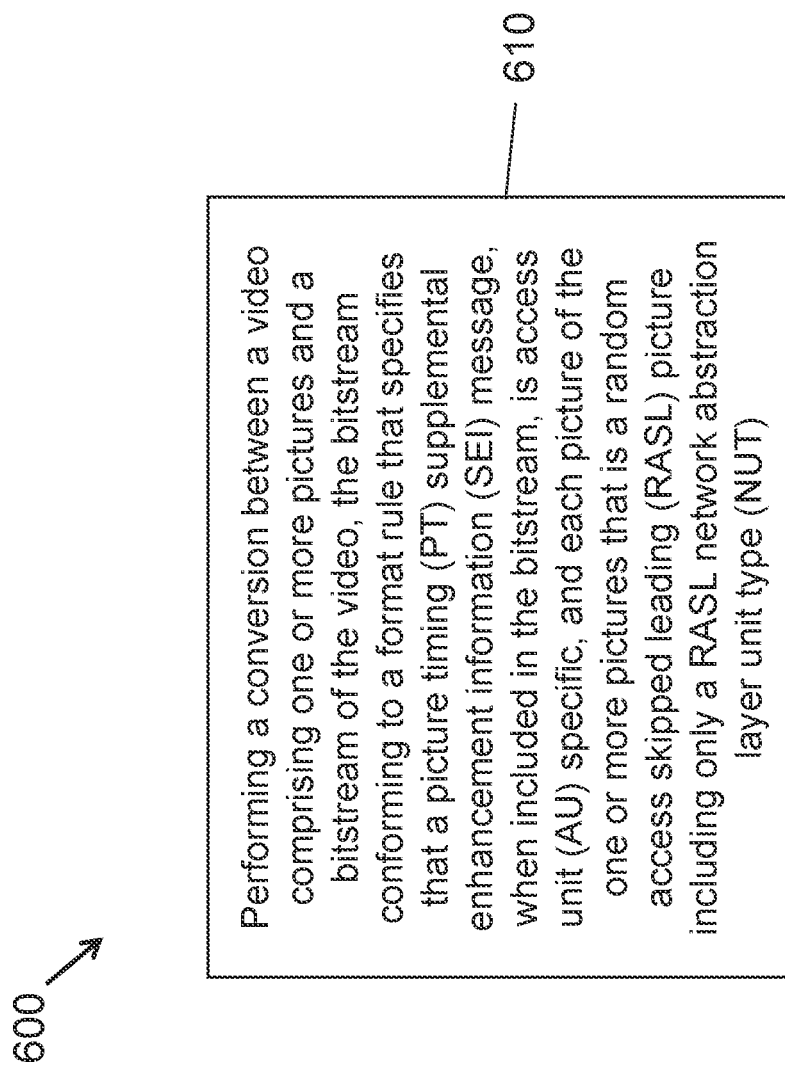

FIG. 6 shows a flowchart for an example method 600 of video processing. The method 600 includes, at operation 610, performing a conversion between a video comprising one or more pictures and a bitstream of the video, the bitstream conforming to a format rule that specifies that a picture timing (PT) supplemental enhancement information (SEI) message, when included in the bitstream, is access unit (AU) specific, and each picture of the one or more pictures that is a random access skipped leading (RASL) picture including only a RASL network abstraction layer unit type (NUT).

Figure 7:
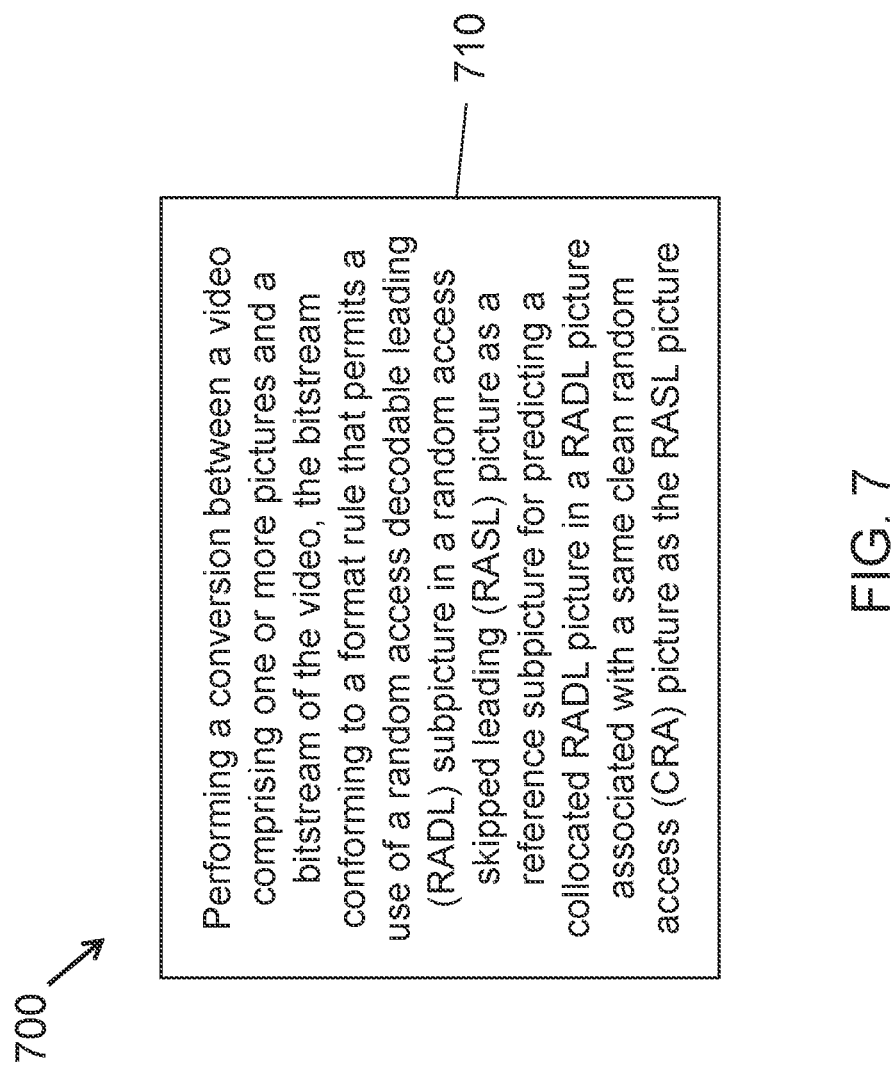

FIG. 7 shows a flowchart for an example method 700 of video processing. The method 700 includes, at operation 710, performing a conversion between a video comprising one or more pictures and a bitstream of the video, the bitstream conforming to a format rule that permits a use of a random access decodable leading (RADL) subpicture in a random access skipped leading (RASL) picture as a reference subpicture for predicting a collocated RADL picture in a RADL picture associated with a same clean random access (CRA) picture as the RASL picture.

Figure 8:
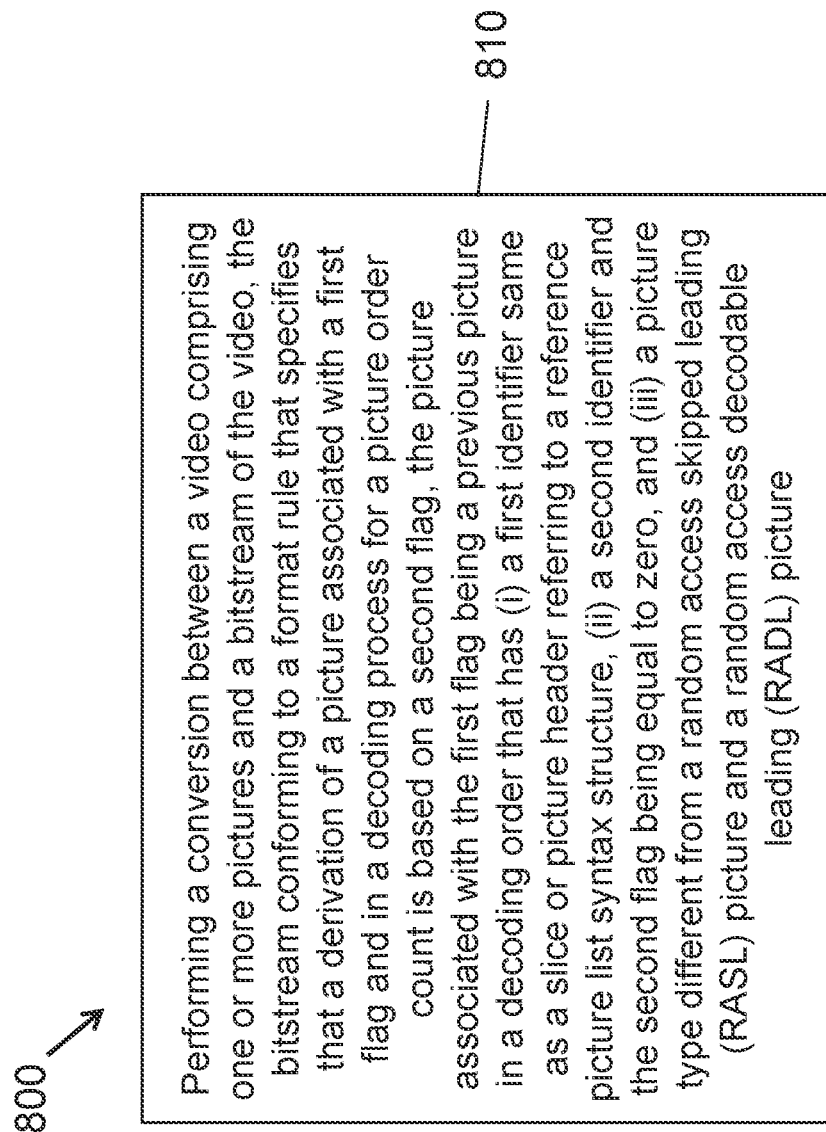

FIG. 8 shows a flowchart for an example method 800 of video processing. The method 800 includes, at operation 810, performing a conversion between a video comprising one or more pictures and a bitstream of the video, the bitstream conforming to a format rule that specifies that a derivation of a picture associated with a first flag and in a decoding process for a picture order count is based on a second flag, the picture associated with the first flag being a previous picture in a decoding order that has (i) a first identifier same as a slice or picture header referring to a reference picture list syntax structure, (ii) a second identifier and the second flag being equal to zero, and (iii) a picture type different from a random access skipped leading (RASL) picture and a random access decodable leading (RADL) picture, the first flag indicating whether a third flag is present in the bitstream, the second flag indicating whether a current picture is used as a reference picture, and the third flag being used to determine a value of one or more most significant bits of a picture order count value of a long-term reference picture.

Figure 9:
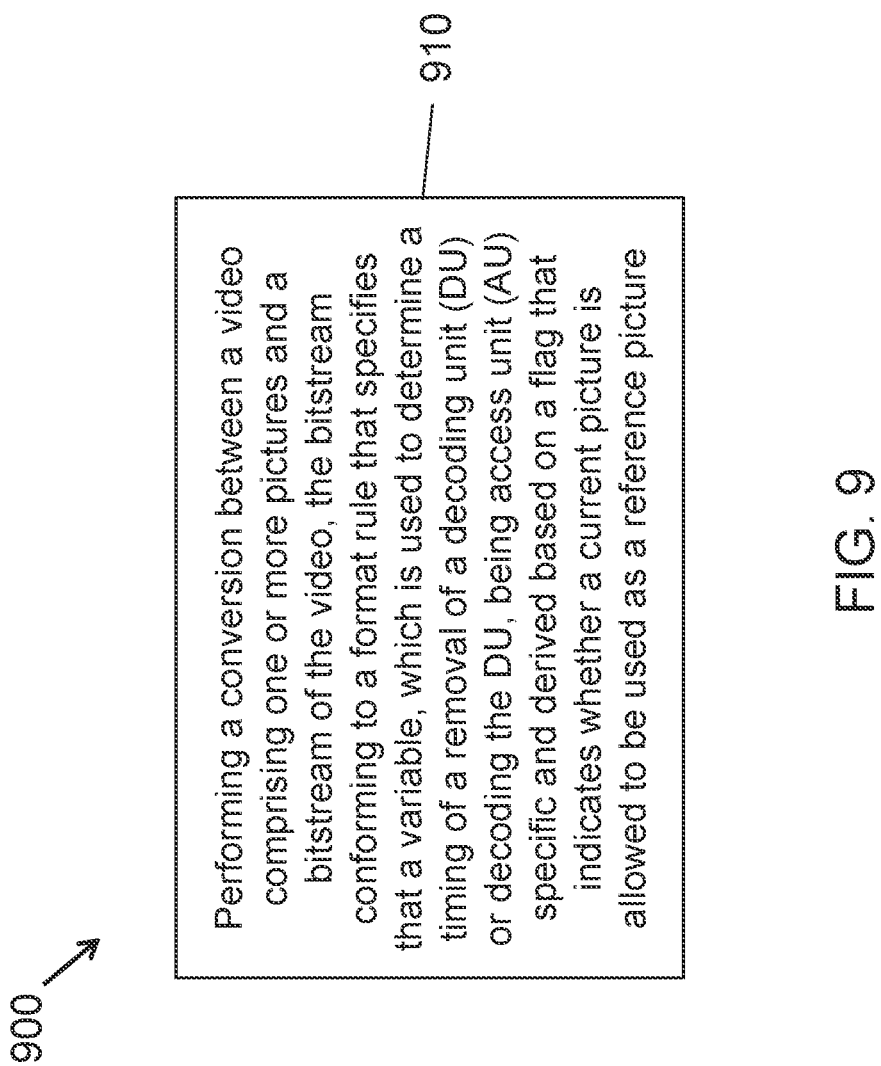

FIG. 9 shows a flowchart for an example method 900 of video processing. The method 900 includes, at operation 910, performing a conversion between a video comprising one or more pictures and a bitstream of the video, the bitstream conforming to a format rule that specifies that a variable, which is used to determine a timing of a removal of a decoding unit (DU) or decoding the DU, being access unit (AU) specific and derived based on a flag that indicates whether a current picture is allowed to be used as a reference picture.

Figure 10:
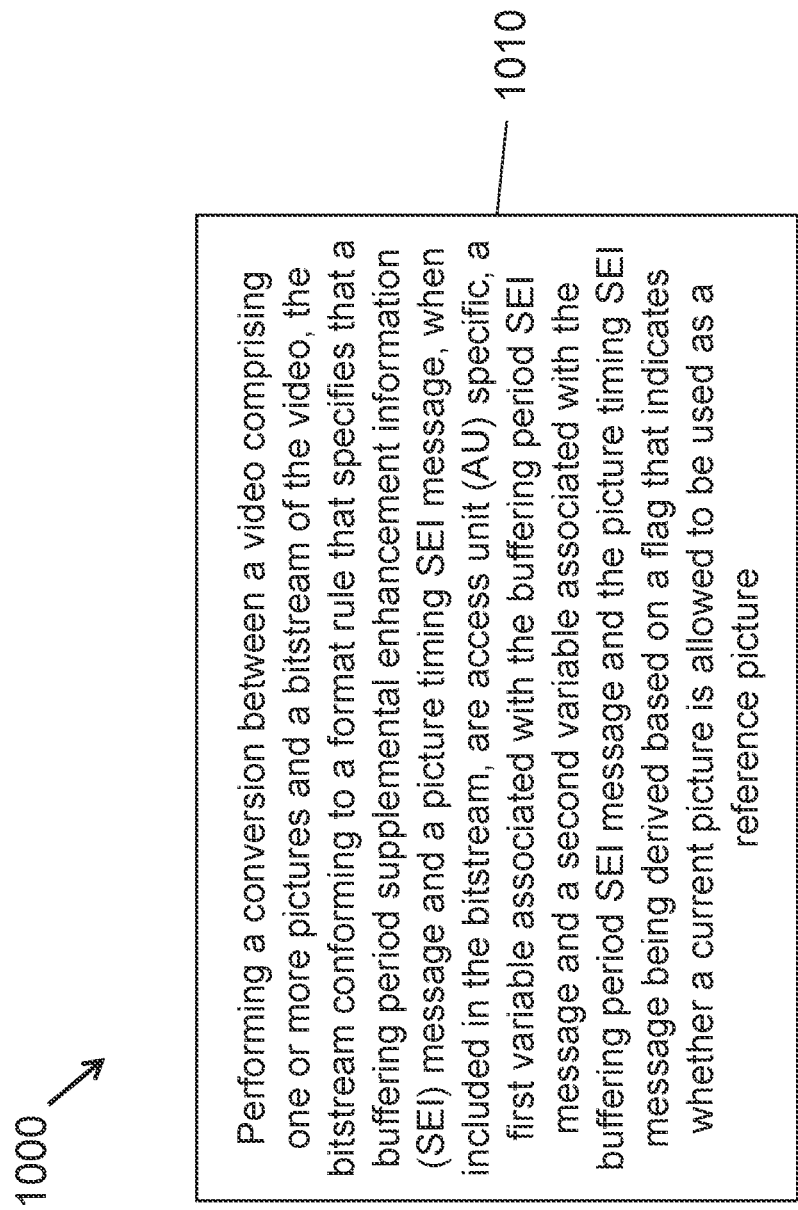

FIG. 10 shows a flowchart for an example method 1000 of video processing. The method 1000 includes, at operation 1010, performing a conversion between a video comprising one or more pictures and a bitstream of the video, the bitstream conforming to a format rule that specifies that a buffering period supplemental enhancement information (SEI) message and a picture timing SEI message, when included in the bitstream, are access unit (AU) specific, a first variable associated with the buffering period SEI message and a second variable associated with the buffering period SEI message and the picture timing SEI message being derived based on a flag that indicates whether a current picture is allowed to be used as a reference picture, the first variable being indicative of an access unit comprising (i) an identifier that is equal to zero and (ii) a picture that is not a random access skipped leading (RASL) picture or a random access decodable leading (RADL) picture and for which the flag is equal to zero, and the second variable being indicative of a current AU not being a first AU in a decoding order and a previous AU in the decoding order comprising (i) the identifier that is equal to zero and (ii) a picture that is not a random access skipped leading (RASL) picture or a random access decodable leading (RADL) picture and for which the flag is equal to zero.

Figure 11:
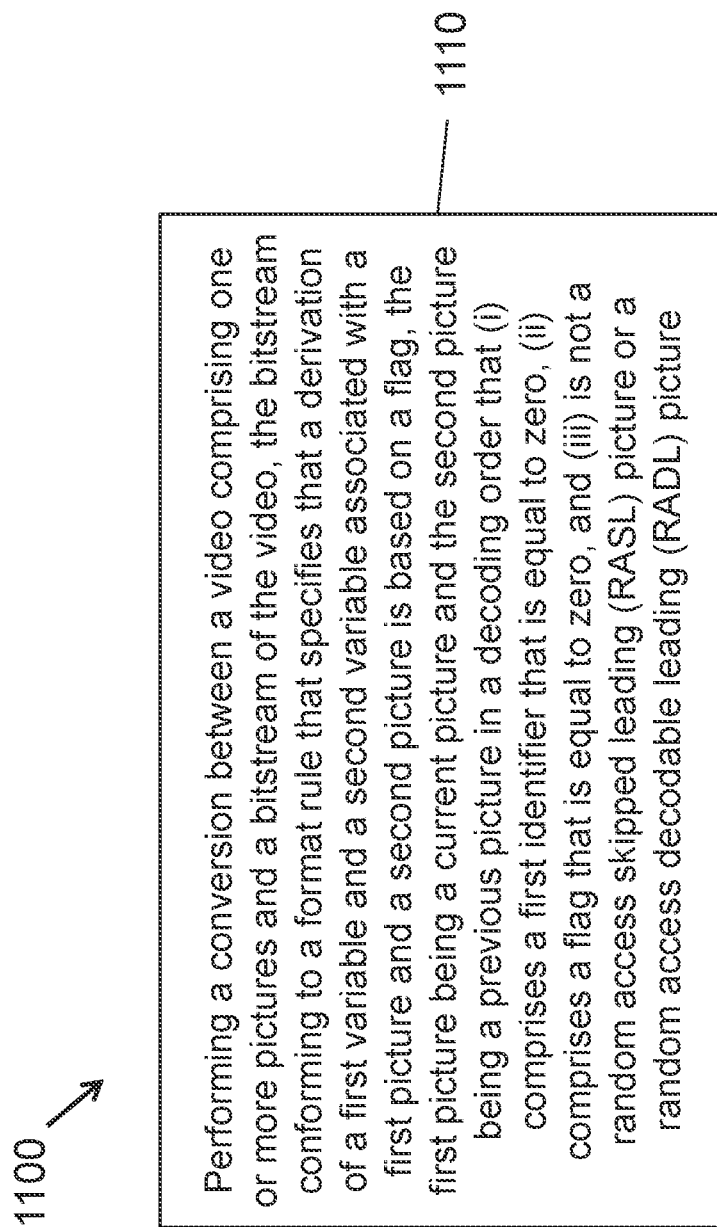

FIG. 11 shows a flowchart for an example method 1100 of video processing. The method 1100 includes, at operation 1110, performing a conversion between a video comprising one or more pictures and a bitstream of the video, the bitstream conforming to a format rule that specifies that a derivation of a first variable and a second variable associated with a first picture and a second picture is based on a flag, the first picture being a current picture and the second picture being a previous picture in a decoding order that (i) comprises a first identifier that is equal to zero, (ii) comprises a flag that is equal to zero, and (iii) is not a random access skipped leading (RASL) picture or a random access decodable leading (RADL) picture, and the first variable and the second variable being a maximum value and a minimum value, respectively, of a picture order count of each of the following pictures with a second identifier that is equal to that of the first picture (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture.

FIG. 12 shows a flowchart for an example method 1200 of video processing. The method 1200 includes, at operation 1210, performing a conversion between a video comprising one or more pictures and a bitstream of the video, the bitstream conforming to a format rule that specifies that a flag and a syntax element, when included in the bitstream, are access unit (AU) specific, the flag indicating, in response to a current AU not being a first AU in the bitstream in a decoding order, whether a nominal coded picture buffer (CPB) removal time of the current AU is determined relative to (a) a nominal CPB removal time of a previous AU associated with a buffering period supplemental enhancement information (SEI) message or (b) a nominal CPB removal time of the current AU, and the syntax element specifying, in response to a current AU not being a first AU in the bitstream in a decoding order, a CPB removal delay increment value relative to the nominal CPB removal time of the current AU.

Figure 13:
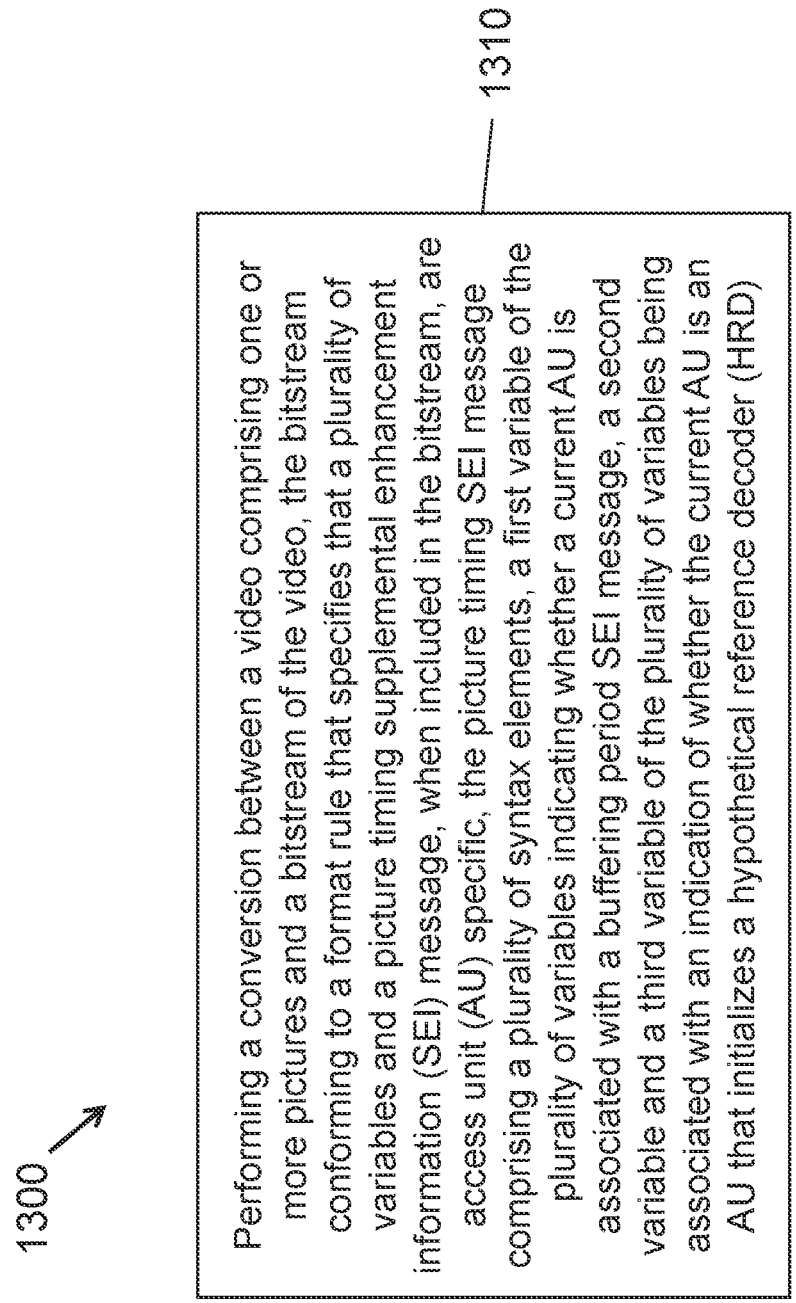

FIG. 13 shows a flowchart for an example method 1300 of video processing. The method 1300 includes, at operation 1310, performing a conversion between a video comprising one or more pictures and a bitstream of the video, the bitstream conforming to a format rule that specifies that a plurality of variables and a picture timing supplemental enhancement information (SEI) message, when included in the bitstream, are access unit (AU) specific, the picture timing SEI message comprising a plurality of syntax elements, a first variable of the plurality of variables indicating whether a current AU is associated with a buffering period SEI message, a second variable and a third variable of the plurality of variables being associated with an indication of whether the current AU is an AU that initializes a hypothetical reference decoder (HRD), a first syntax element of the plurality of syntax elements specifying a number of clock ticks to wait after a removal of an AU from a coded picture buffer (CPB) before one or more decoded pictures of the AU are output from the decoded picture buffer (DPB), a second syntax element of the plurality of syntax elements specifying a number of sub clock ticks to wait after a removal of a last decoding unit (DU) in an AU from the CPB before the one or more decoded pictures of the AU are output from the DPB, and a third syntax element of the plurality of syntax elements specifying a number of elemental picture period intervals that one or more decoded pictures of the current AU occupy for a display model.

Figure 14:
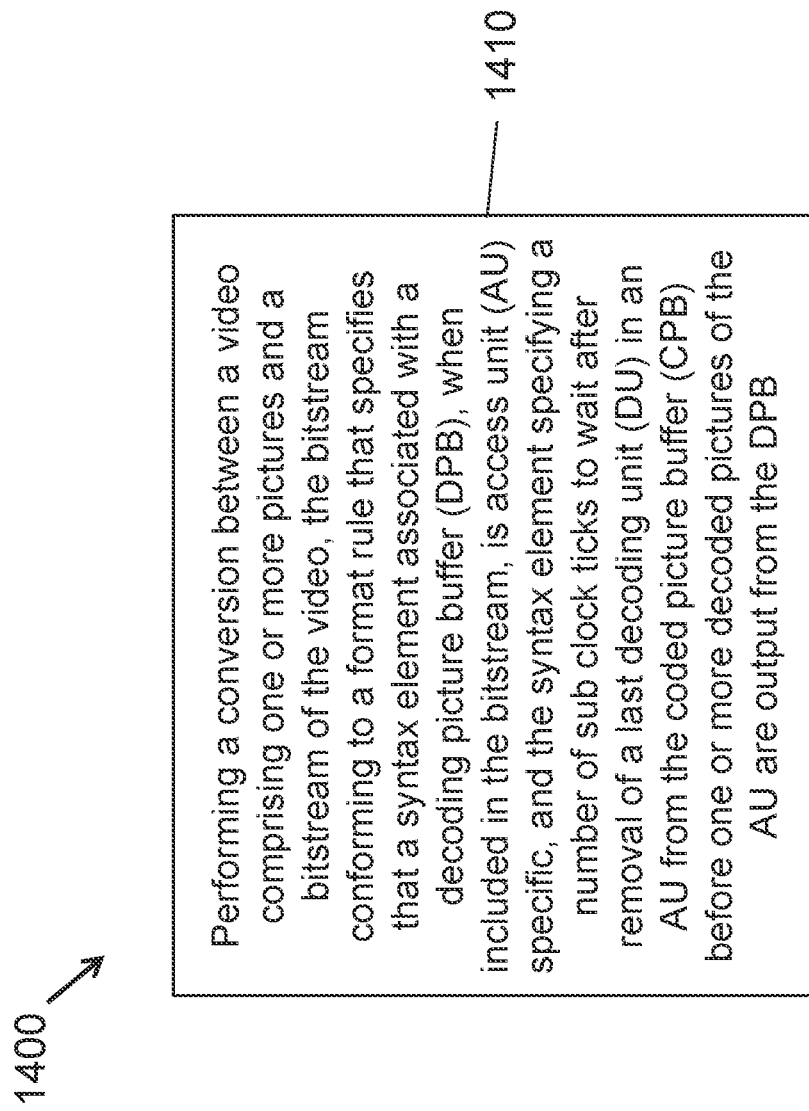

FIG. 14 shows a flowchart for an example method 1400 of video processing. The method 1400 includes, at operation 1410, performing a conversion between a video comprising one or more pictures and a bitstream of the video, the bitstream conforming to a format rule that specifies that a syntax element associated with a decoding picture buffer (DPB), when included in the bitstream, is access unit (AU) specific, and the syntax element specifying a number of sub clock ticks to wait after removal of a last decoding unit (DU) in an AU from the coded picture buffer (CPB) before one or more decoded pictures of the AU are output from the DPB.

Figure 15:
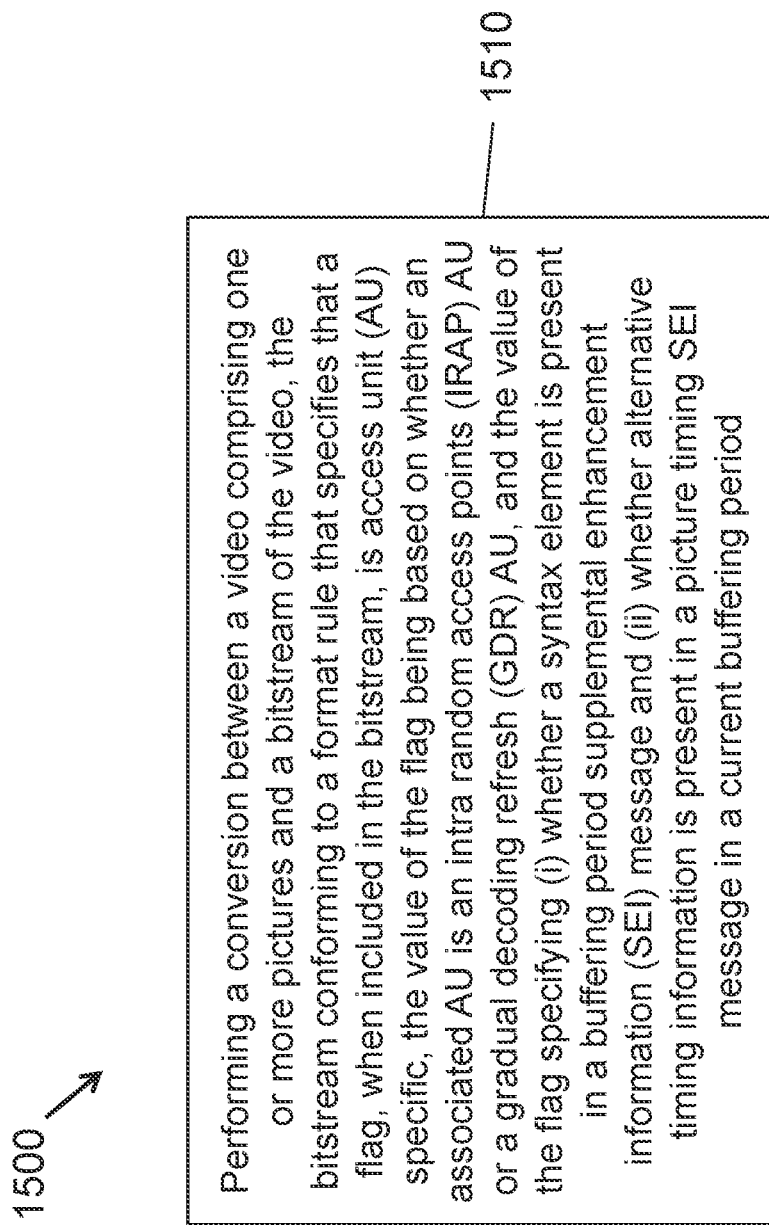

FIG. 15 shows a flowchart for an example method 1500 of video processing. The method 1500 includes, at operation 1510, performing a conversion between a video comprising one or more pictures and a bitstream of the video, the bitstream conforming to a format rule that specifies that a flag, when included in the bitstream, is access unit (AU) specific, the value of the flag being based on whether an associated AU is an intra random access points (IRAP) AU or a gradual decoding refresh (GDR) AU, and the value of the flag specifying (i) whether a syntax element is present in a buffering period supplemental enhancement information (SEI) message and (ii) whether alternative timing information is present in a picture timing SEI message in a current buffering period.

Figure 16:
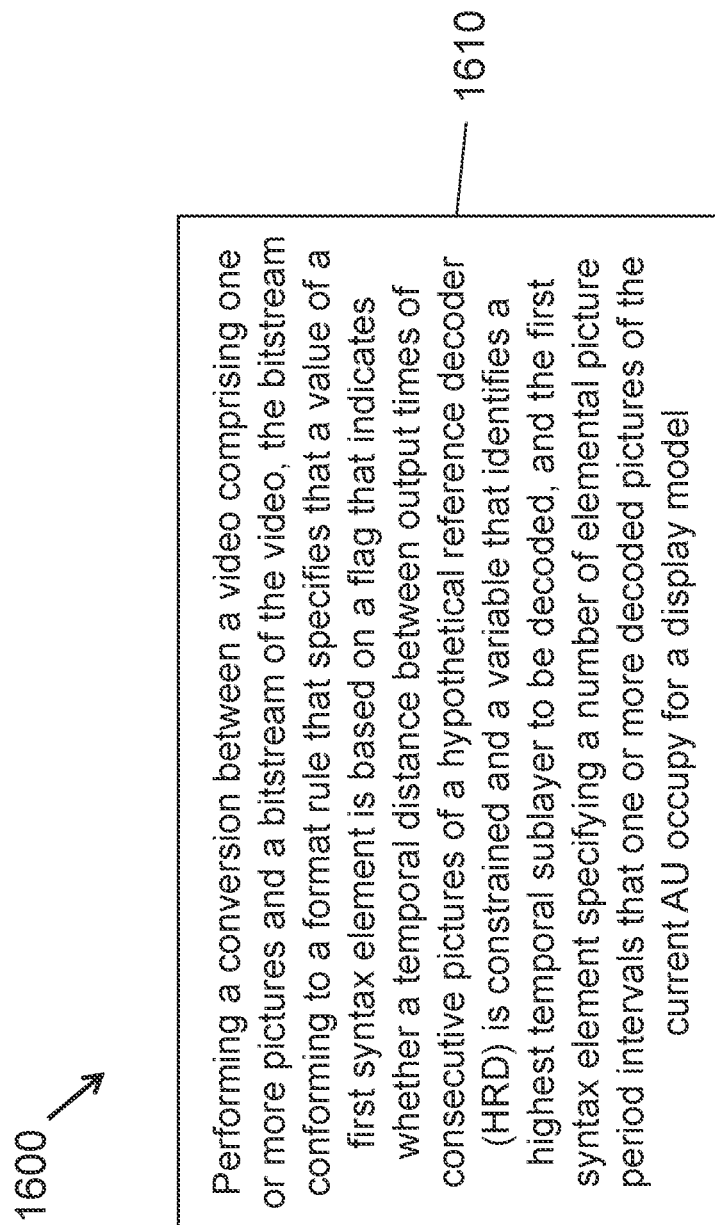

FIG. 16 shows a flowchart for an example method 1600 of video processing. The method 1600 includes, at operation 1610, performing a conversion between a video comprising one or more pictures and a bitstream of the video, the bitstream conforming to a format rule that specifies that a value of a first syntax element is based on a flag that indicates whether a temporal distance between output times of consecutive pictures of a hypothetical reference decoder (HRD) is constrained and a variable that identifies a highest temporal sublayer to be decoded, and the first syntax element specifying a number of elemental picture period intervals that one or more decoded pictures of the current AU occupy for a display model.

A listing of solutions preferred by some embodiments is provided next.

A1. A method of video processing, comprising performing a conversion between a video comprising one or more pictures and a bitstream of the video, wherein the bitstream conforms to a format rule, wherein the format rule specifies that a picture timing (PT) supplemental enhancement information (SEI) message, when included in the bitstream, is access unit (AU) specific, and wherein each picture of the one or more pictures that is a random access skipped leading (RASL) picture includes only a RASL network abstraction layer unit type (NUT).

A2. The method of solution A1, wherein, in response to each picture in an associated AU being a RASL picture with a first flag equaling zero, a second flag is equal to zero, wherein the first flag indicates whether each picture referring to a picture parameter set (PPS) has more than one video coding layer (VCL) network abstraction layer (NAL) unit and at least two of the more than one VCL NAL units are of different types, and wherein the second flag indicates whether one or more syntax elements related to timing information are allowed to be present in the picture timing SEI message.

A3. The method of solution A2, wherein the first flag is pps_mixed_nalu_types_in_pic_flag and the second flag is pt_cpb_alt_timing_info_present_flag.

A4. The method of solution A2, wherein the one or more syntax elements comprises at least one of a first syntax element indicating an alternative initial coded picture buffer (CPB) removal delay delta for an i-th sublayer for a j-th CPB for a NAL hypothetical reference decoder (HRD) in units of a 90 kHz clock, a second syntax element indicating an alternative initial CPB removal offset delta for the i-th sublayer for the j-th CPB for the NAL HRD in units of a 90 kHz clock, a third syntax element indicating, for the i-th sublayer for the NAL HRD, an offset to be used in a derivation of a nominal CPB removal time of an AU associated with the PT SEI message and of one or more subsequent AUs in a decoding order, when the AU associated with the PT SEI message directly follows, in the decoding order, an AU associated with a buffering period (BP) SEI message, a fourth syntax element indicating, for the i-th sublayer for the NAL HRD, an offset to be used in a derivation of a decoded picture buffer (DPB) output time of an intra random access point (IRAP) AU associated with the BP SEI message when the AU associated with the PT SEI message directly follows, in the decoding order, the IRAP AU associated with the BP SEI message, a fifth syntax element indicating an alternative initial CPB removal delay delta for an i-th sublayer for a j-th CPB for a VCL HRD in units of a 90 kHz clock, a sixth syntax element indicating alternative initial CPB removal offset delta for the i-th sublayer for the j-th CPB for the VCL HRD in units of a 90 kHz clock, a seventh syntax element indicating, for the i-th sublayer for the VCL HRD, an offset to be used in the derivation of the nominal CPB removal time of the AU associated with the PT SEI message and of the one or more subsequent AUs in a decoding order, when the AU associated with the PT SEI message directly follows, in the decoding order, the AU associated with the BP SEI message, an eighth syntax element indicating for the i-th sublayer for the VCL HRD, an offset to be used in the derivation of the DPB output time of the IRAP AU associated with the BP SEI message when the AU associated with the PT SEI message directly follows, in the decoding order, the IRAP AU associated with the BP SEI message.

A5. The method of solution A1, wherein, in response to each picture in an associated AU being a RASL picture including video coding layer (VCL) network abstraction layer (NAL) units with each VCL NAL unit being a RASL NUT, a flag is equal to zero, wherein the flag indicates whether one or more syntax elements related to timing information are present in the picture timing SEI message.

A6. The method of solution A5, wherein the flag is pt_cpb_alt_timing_info_present_flag.

A7. A method of video processing, comprising performing a conversion between a video comprising one or more pictures and a bitstream of the video, wherein the bitstream conforms to a format rule, wherein the format rule permits a use of a random access decodable leading (RADL) subpicture in a random access skipped leading (RASL) picture as a reference subpicture for predicting a collocated RADL picture in a RADL picture associated with a same clean random access (CRA) picture as the RASL picture.

Another listing of solutions preferred by some embodiments is provided next.

B1. A method of video processing, comprising performing a conversion between a video comprising one or more pictures and a bitstream of the video, wherein the bitstream conforms to a format rule, wherein the format rule specifies that a derivation of a picture associated with a first flag and in a decoding process for a picture order count is based on a second flag, wherein the picture associated with the first flag is a previous picture in a decoding order that has (i) a first identifier same as a slice or picture header referring to a reference picture list syntax structure, (ii) a second identifier and the second flag being equal to zero, and (iii) a picture type different from a random access skipped leading (RASL) picture and a random access decodable leading (RADL) picture, wherein the first flag indicates whether a third flag is present in the bitstream, wherein the second flag indicates whether a current picture is used as a reference picture, and wherein the third flag is used to determine a value of one or more most significant bits of a picture order count value of a long-term reference picture.

B2. The method of solution B1, wherein the first identifier is an identifier of a layer and the second identifier is a temporal identifier.

B3. The method of solution B1, wherein the first identifier is a syntax element and the second identifier is a variable.

B4. The method of any of solutions B1 to B3, wherein the first flag is delta_poc_msb_cycle_present_flag, the second flag is ph_non_ref_pic_flag, and the third flag is delta_poc_msb_cycle_present_flag, and wherein the first identifier is nuh_layer_id and the second identifier is TemporalId.

B5. A method of video processing, comprising performing a conversion between a video comprising one or more pictures and a bitstream of the video, wherein the bitstream conforms to a format rule, wherein the format rule specifies that a variable, which is used to determine a timing of a removal of a decoding unit (DU) or decoding the DU, is access unit (AU) specific and derived based on a flag that indicates whether a current picture is allowed to be used as a reference picture.

B6. The method of solution B5, wherein the variable is prevNonDiscardableAu and the flag is ph_non_ref_pic_flag.

B7. The method of solution B6, wherein ph_non_ref_pic_flag equaling one specifies that the current picture is never used as the reference picture.

B8. The method of solution B6, wherein ph_non_ref_pic_flag equaling zero specifies that the current picture might or might not be used as the reference picture.

B9. A method of video processing, comprising performing a conversion between a video comprising one or more pictures and a bitstream of the video, wherein the bitstream conforms to a format rule, wherein the format rule specifies that a buffering period supplemental enhancement information (SEI) message and a picture timing SEI message, when included in the bitstream, are access unit (AU) specific, wherein a first variable associated with the buffering period SEI message and a second variable associated with the buffering period SEI message and the picture timing SEI message are derived based on a flag that indicates whether a current picture is allowed to be used as a reference picture, wherein the first variable is indicative of an access unit comprising (i) an identifier that is equal to zero and (ii) a picture that is not a random access skipped leading (RASL) picture or a random access decodable leading (RADL) picture and for which the flag is equal to zero, and wherein the second variable is indicative of a current AU not being a first AU in a decoding order and a previous AU in the decoding order comprising (i) the identifier that is equal to zero and (ii) a picture that is not a random access skipped leading (RASL) picture or a random access decodable leading (RADL) picture and for which the flag is equal to zero.

B10. The method of solution B9, wherein the identifier is a temporal identifier.

B11. The method of solution B9, wherein the first variable is notDiscardableAu, the second variable is prevNonDiscardableAu, the flag is ph_non_ref_pic_flag, and the identifier is TemporalId.

B12. A method of video processing, comprising performing a conversion between a video comprising one or more pictures and a bitstream of the video, wherein the bitstream conforms to a format rule, wherein the format rule specifies that a derivation of a first variable and a second variable associated with a first picture and a second picture is based on a flag, wherein the first picture is a current picture and the second picture is a previous picture in a decoding order that (i) comprises a first identifier that is equal to zero, (ii) comprises a flag that is equal to zero, and (iii) is not a random access skipped leading (RASL) picture or a random access decodable leading (RADL) picture, and wherein the first variable and the second variable are a maximum value and a minimum value, respectively, of a picture order count of each of the following pictures with a second identifier that is equal to that of the first picture (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture.

B13. The method of solution B12, wherein the first variable indicates the maximum value of the picture order count and the second variable indicates the minimum value of the picture order count.

B14. The method of solution B12, wherein the flag indicates whether the current picture is allowed to be used as a reference picture.

B15. The method of solution B12, wherein the first identifier is a temporal identifier and the second identifier is an identifier of a layer.

B16. The method of any of solutions B12 to B15, wherein the first variable is maxPicOrderCnt, the second variable is minPicOrderCnt, the first identifier is TemporalId, the second identifier is nuh_layer_id, and the flag is ph_non_ref_pic_flag.

Yet another listing of solutions preferred by some embodiments is provided next.

C1. A method of video processing, comprising performing a conversion between a video comprising one or more pictures and a bitstream of the video, wherein the bitstream conforms to a format rule, wherein the format rule specifies that a flag and a syntax element, when included in the bitstream, are access unit (AU) specific, wherein the flag indicates, in response to a current AU not being a first AU in the bitstream in a decoding order, whether a nominal coded picture buffer (CPB) removal time of the current AU is determined relative to (a) a nominal CPB removal time of a previous AU associated with a buffering period supplemental enhancement information (SEI) message or (b) a nominal CPB removal time of the current AU, and wherein the syntax element specifies, in response to a current AU not being a first AU in the bitstream in a decoding order, a CPB removal delay increment value relative to the nominal CPB removal time of the current AU.

C2. The method of solution C1, wherein a length of the syntax element is indicated in a syntax structure of the buffering period SEI message.

C3. The method of solution C1, wherein a length of the syntax element is (bp_cpb_removal_delay_length_minus1+1) bits.

C4. The method of any of solutions C1 to C3, wherein the flag is bp_concatenation_flag and the syntax element is bp_cpb_removal_delay_delta_minus1.

C5. A method of video processing, comprising performing a conversion between a video comprising one or more pictures and a bitstream of the video, wherein the bitstream conforms to a format rule, wherein the format rule specifies that a plurality of variables and a picture timing supplemental enhancement information (SEI) message, when included in the bitstream, are access unit (AU) specific, wherein the picture timing SEI message comprises a plurality of syntax elements, wherein a first variable of the plurality of variables indicates whether a current AU is associated with a buffering period SEI message, wherein a second variable and a third variable of the plurality of variables are associated with an indication of whether the current AU is an AU that initializes a hypothetical reference decoder (HRD), wherein a first syntax element of the plurality of syntax elements specifies a number of clock ticks to wait after a removal of an AU from a coded picture buffer (CPB) before one or more decoded pictures of the AU are output from the decoded picture buffer (DPB), wherein a second syntax element of the plurality of syntax elements specifies a number of sub clock ticks to wait after a removal of a last decoding unit (DU) in an AU from the CPB before the one or more decoded pictures of the AU are output from the DPB, and wherein a third syntax element of the plurality of syntax elements specifies a number of elemental picture period intervals that one or more decoded pictures of the current AU occupy for a display model.

C6. The method of solution C5, wherein the first variable is BpResetFlag, the second variable is CpbRemovalDelayMsb, and the third variable is CpbRemovalDelayVal.

C7. The method of solution C5, wherein the first syntax element is pt_dpb_output_delay, the second syntax element is pt_dpb_output_du_delay, and the third syntax element is pt_display_elemental_periods_minus1.

C8. A method of video processing, comprising performing a conversion between a video comprising one or more pictures and a bitstream of the video, wherein the bitstream conforms to a format rule, wherein the format rule specifies that a syntax element associated with a decoding picture buffer (DPB), when included in the bitstream, is access unit (AU) specific, and wherein the syntax element specifies a number of sub clock ticks to wait after removal of a last decoding unit (DU) in an AU from the coded picture buffer (CPB) before one or more decoded pictures of the AU are output from the DPB.

C9. The method of solution C8, wherein the syntax element is used to compute a DPB output time.

C10. The method of solution C8, wherein the syntax element is dui_dpb_output_du_delay.

Yet another listing of solutions preferred by some embodiments is provided next.

D1. A method of video processing, comprising performing a conversion between a video comprising one or more pictures and a bitstream of the video, wherein the bitstream conforms to a format rule, wherein the format rule specifies that a flag, when included in the bitstream, is access unit (AU) specific, wherein the value of the flag is based on whether an associated AU is an intra random access points (IRAP) AU or a gradual decoding refresh (GDR) AU, and wherein the value of the flag specifies (i) whether a syntax element is present in a buffering period supplemental enhancement information (SEI) message and (ii) whether alternative timing information is present in a picture timing SEI message in a current buffering period.

D2. The method of solution D1, wherein the value of the flag is equal to zero in response to the associated AU not being an IRAP AU or a GDR AU.

D3. The method of solution D1, wherein the value of the flag is inferred to be zero in response to the flag not being included in the bitstream.

D4. The method of solution D1, wherein the value of the flag being one specifies that the syntax element is present in the buffering period SEI message.

D5. The method of any of solutions D1 to D4, wherein the flag is bp_alt_cpb_params_present_flag and the syntax element is bp_use_alt_cpb_params_flag.

Yet another listing of solutions preferred by some embodiments is provided next.

E1. A method of video processing, comprising performing a conversion between a video comprising one or more pictures and a bitstream of the video, wherein the bitstream conforms to a format rule, wherein the format rule specifies that a value of a first syntax element is based on a flag that indicates whether a temporal distance between output times of consecutive pictures of a hypothetical reference decoder (HRD) is constrained and a variable that identifies a highest temporal sublayer to be decoded, and wherein the first syntax element specifies a number of elemental picture period intervals that one or more decoded pictures of the current AU occupy for a display model.

E2. The method of solution E1, wherein the variable identifies a highest temporal sublayer to be decoded.

E3. The method of solution E1 or E2, wherein the variable is Htid.

E4. The method of solution E1, wherein the flag is a second syntax element included in an output layer set (OLS) timing and HRD parameters syntax structure.

E5. The method of solution E1, wherein the first syntax element is included in a picture timing supplemental enhancement information (SEI) message.

E6. The method of any of solutions E1 to E5, wherein the flag is fixed_pic_rate_within_cvs_flag, the first syntax element is pt_display_elemental_periods_minus1, and the variable is Htid.

The following applies to one or more of the aforementioned solutions.

O1. The method of any of the preceding solutions, wherein the conversion comprises decoding the video from the bitstream.

O2. The method of any of the preceding solutions, wherein the conversion comprises encoding the video into the bitstream.

O3. A method of storing a bitstream representing a video to a computer-readable recording medium, comprising generating the bitstream from the video according to a method described in any one or more of the preceding solutions; and storing the bitstream in the computer-readable recording medium.

O4. A video processing apparatus comprising a processor configured to implement a method recited in any one or more of the preceding solutions.

O5. A computer-readable medium having instructions stored thereon, the instructions, when executed, causing a processor to implement a method recited in one or more of the preceding solutions.

O6. A computer readable medium that stores the bitstream generated according to any one or more of the preceding solutions.

O7. A video processing apparatus for storing a bitstream, wherein the video processing apparatus is configured to implement a method recited in any one or more of the preceding solutions.

Yet another listing of solutions preferred by some embodiments is provided next.

P1. A video processing method, comprising performing a conversion between a video comprising one or more video pictures and a coded representation of the video, wherein the coded representation conforms to a format rule, wherein the format rule permits use of a random access decodable leading (RADL) subpicture in a random access skipped leading (RASL) picture as a reference subpicture for predicting a collocated RADL picture in a RADL picture associated with a same clean random access picture as the RASL picture.

P2. A video processing method, comprising performing a conversion between a video comprising one or more video pictures and a coded representation of the video, wherein the coded representation conforms to a format rule, wherein the format rule specifies that a picture timing supplemental enhancement information message, when included in the coded representation, is access unit specific and wherein corresponding random access skipped leading (RASL) pictures must include RASL network abstraction layer unit type (NUTs).

P3. The method of solution P1 or P2, wherein the performing the conversion comprises parsing and decoding the coded representation to generate the video.

P4. The method of solution P1 or P2, wherein the performing the conversion comprises encoding the video into the coded representation.

P5. A video decoding apparatus comprising a processor configured to implement a method recited in one or more of solutions P1 to P4.

P6. A video encoding apparatus comprising a processor configured to implement a method recited in one or more of solutions P1 to P4.

P7. A computer program product having computer code stored thereon, the code, when executed by a processor, causes the processor to implement a method recited in any of solutions P1 to P4.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video comprising one or more pictures and a bitstream of the video,
wherein the bitstream conforms to a format rule,
wherein the format rule specifies that a derivation of a previous picture in a semantics associated with a first flag and in a decoding process for a picture order count is based on a second flag,
wherein the previous picture is a previous picture in a decoding order that has (i) a first identifier that is the same as a slice or picture header referring to a reference picture list syntax structure, (ii) a second identifier and the second flag being both equal to zero, and (iii) a picture type different from a random access skipped leading (RASL) picture and a random access decodable leading (RADL) picture,
wherein the first flag indicates whether a third flag is present in the bitstream,
wherein the second flag indicates whether a current picture is allowed to be used as a reference picture, and
wherein the third flag is used to determine a first variable associated with a picture order count value of a long-term reference picture.

2. The method of claim 1, wherein the first identifier is an identifier of a layer and is a syntax element, and the second identifier is a temporal identifier and is a variable.

3. The method of claim 1, wherein the first flag is delta_poc_msb_cycle_present_flag, the second flag is ph_non_ref_pic_flag, and the third flag is delta_poc_msb_cycle_lt, and wherein the first identifier is nuh_layer_id and the second identifier is TemporalId.

4. The method of claim 1, wherein the format rule specifies that a second variable prevNonDiscardableAu, which is used to determine a timing of a removal of a decoding unit (DU) or a decoding of the DU, is access unit (AU) specific, and is derived based on the second flag.

5. The method of claim 1, wherein the second flag equaling one specifies that the current picture is never used as the reference picture, and the second flag equaling zero specifies that the current picture is allowed to be or not to be used as the reference picture.

6. The method of claim 1, wherein the format rule specifies that a buffering period (BF) supplemental enhancement information (SEI) message and a picture timing SEI message, when included in the bitstream, are access unit (AU) specific,
wherein a third variable associated with the buffering period SEI message and a fourth variable associated with the buffering period SEI message and the picture timing SEI message are derived based on the second flag,
wherein the third variable is indicative of an AU comprising (i) the second identifier of the AU that is equal to zero and (ii) at least one picture that is not a RASL picture or a RADL picture and for which the second flag is equal to zero, and
wherein when a current AU not being a first AU in a decoding order, the fourth variable is indicative of a previous AU in the decoding order comprising (i) the second identifier that is equal to zero and (ii) at least one picture that is not a RASL picture or a RADL picture and for which the second flag is equal to zero.

7. The method of claim 6, wherein the third variable is notDiscardableAu, and the fourth variable is prevNonDiscardableAu.

8. The method of claim 1, wherein the format rule specifies that a derivation of a fifth variable and a sixth variable associated with a first picture and a second picture is based on the second flag,
wherein the first picture is a current picture and the second picture is a previous picture in a decoding order that (i) comprises the second identifier that is equal to zero, (ii) comprises the second flag that is equal to zero, and (iii) is not a RASL picture or a RADL picture, and
wherein the fifth variable and the sixth variable are a maximum value and a minimum value, respectively, of a picture order count of each of the following pictures with the first identifier that is equal to that of the first picture: (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture.

9. The method of claim 8, wherein the fifth variable is maxPicOrderCnt and indicates the maximum value of the picture order count, and the sixth variable is minPicOrderCnt and indicates the minimum value of the picture order count.

10. The method of claim 1, wherein the conversion comprises decoding the video from the bitstream.

11. The method of claim 1, wherein the conversion comprises encoding the video into the bitstream.

12. An apparatus for processing video data comprising a processor and a non-transitory memory with instructions thereon, wherein the instructions upon execution by the processor, cause the processor to:
perform a conversion between a video comprising one or more pictures and a bitstream of the video, wherein the bitstream conforms to a format rule,
wherein the format rule specifies that a derivation of a previous picture in a semantics associated with a first flag and in a decoding process for a picture order count is based on a second flag,
wherein the previous picture is a previous picture in a decoding order that has (i) a first identifier that is the same as a slice or picture header referring to a reference picture list syntax structure, (ii) a second identifier and the second flag being both equal to zero, and (iii) a picture type different from a random access skipped leading (RASL) picture and a random access decodable leading (RADL) picture,
wherein the first flag indicates whether a third flag is present in the bitstream,
wherein the second flag indicates whether a current picture is allowed to be used as a reference picture, and
wherein the third flag is used to determine a first variable associated with a picture order count value of a long-term reference picture.

13. The apparatus of claim 12, wherein the first identifier is an identifier of a layer and is a syntax element nuh_layer_id, and the second identifier is a temporal identifier and is a variable TemporalId,
wherein the first flag is delta_poc_msb_cycle_present_flag, the second flag is ph_non_ref_pic_flag, and wherein the second flag equaling one specifies that the current picture is never used as the reference picture, and the second flag equaling zero specifies that the current picture might or might not be used as the reference picture.

14. The apparatus of claim 12, wherein the format rule specifies that a second variable prevNonDiscardableAu, which is used to determine a timing of a removal of a decoding unit (DU) or a decoding of the DU, is access unit (AU) specific, and is derived based on the second flag.

15. The apparatus of claim 12, wherein the format rule specifies that a buffering period (BF) supplemental enhancement information (SEI) message and a picture timing SEI message, when included in the bitstream, are access unit (AU) specific,
wherein a third variable associated with the buffering period SEI message and a fourth variable associated with the buffering period SEI message and the picture timing SEI message are derived based on the second flag,
wherein the third variable is indicative of an AU comprising (i) the second identifier of the AU that is equal to zero and (ii) at least one picture that is not a RASL picture or a RADL picture and for which the second flag is equal to zero,
wherein when a current AU not being a first AU in a decoding order, the fourth variable is indicative of a previous AU in the decoding order comprising (i) the second identifier that is equal to zero and (ii) at least one picture that is not a RASL picture or a RADL picture and for which the second flag is equal to zero, and
wherein the third variable is notDiscardableAu, and the fourth variable is prevNonDiscardableAu.

16. The apparatus of claim 12, wherein the format rule specifies that a derivation of a fifth variable and a sixth variable associated with a first picture and a second picture is based on the second flag,
wherein the first picture is a current picture and the second picture is a previous picture in a decoding order that (i) comprises the second identifier that is equal to zero, (ii) comprises the second flag that is equal to zero, and (iii) is not a RASL picture or a RADL picture,
wherein the fifth variable and the sixth variable are a maximum value and a minimum value, respectively, of a picture order count of each of the following pictures with the first identifier that is equal to that of the first picture: (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture, and
wherein the fifth variable is maxPicOrderCnt and indicates the maximum value of the picture order count, and the sixth variable is minPicOrderCnt and indicates the minimum value of the picture order count.

17. A non-transitory computer-readable storage medium storing instructions that cause a processor to:
perform a conversion between a video comprising one or more pictures and a bitstream of the video,
wherein the bitstream conforms to a format rule,
wherein the format rule specifies that a derivation of a previous picture in a semantics associated with a first flag and in a decoding process for a picture order count is based on a second flag,
wherein the previous picture is a previous picture in a decoding order that has (i) a first identifier that is the same as a slice or picture header referring to a reference picture list syntax structure, (ii) a second identifier and the second flag being both equal to zero, and (iii) a picture type different from a random access skipped leading (RASL) picture and a random access decodable leading (RADL) picture,
wherein the first flag indicates whether a third flag is present in the bitstream,
wherein the second flag indicates whether a current picture is allowed to be used as a reference picture, and
wherein the third flag is used to determine a first variable associated with a picture order count value of a long-term reference picture.

18. The non-transitory computer-readable storage medium of claim 17, wherein the format rule specifies that a second variable prevNonDiscardableAu, which is used to determine a timing of a removal of a decoding unit (DU) or a decoding of the DU, is access unit (AU) specific, and is derived based on the second flag,
wherein the format rule specifies that a buffering period (BF) supplemental enhancement information (SEI) message and a picture timing SEI message, when included in the bitstream, are access unit (AU) specific,
wherein a third variable associated with the buffering period SEI message and a fourth variable associated with the buffering period SEI message and the picture timing SEI message are derived based on the second flag,
wherein the third variable is indicative of an AU comprising (i) the second identifier of the AU that is equal to zero and (ii) at least one picture that is not a RASL picture or a RADL picture and for which the second flag is equal to zero,
wherein when a current AU not being a first AU in a decoding order, the fourth variable is indicative of a previous AU in the decoding order comprising (i) the second identifier that is equal to zero and (ii) at least one picture that is not a RASL picture or a RADL picture and for which the second flag is equal to zero,
wherein the third variable is notDiscardableAu, and the fourth variable is prevNonDiscardableAu,
wherein the format rule specifies that a derivation of a fifth variable and a sixth variable associated with a first picture and a second picture is based on the second flag,
wherein the first picture is a current picture and the second picture is a previous picture in a decoding order that (i) comprises the second identifier that is equal to zero, (ii) comprises the second flag that is equal to zero, and (iii) is not a RASL picture or a RADL picture,
wherein the fifth variable and the sixth variable are a maximum value and a minimum value, respectively, of a picture order count of each of the following pictures with the first identifier that is equal to that of the first picture: (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture, and
wherein the fifth variable is maxPicOrderCnt and indicates the maximum value of the picture order count, and the sixth variable is minPicOrderCnt and indicates the minimum value of the picture order count.

19. A method for storing a bitstream of a video, comprising:
generating the bitstream of the video comprising one or more pictures; and
storing the bitsream in a non-transitory computer-readable recording medium,
wherein the bitstream conforms to a format rule,
wherein the format rule specifies that a derivation of a previous picture in a semantics associated with a first flag and in a decoding process for a picture order count is based on a second flag,
wherein the previous picture is a previous picture in a decoding order that has (i) a first identifier that is the same as a slice or picture header referring to a reference picture list syntax structure, (ii) a second identifier and the second flag being both equal to zero, and (iii) a picture type different from a random access skipped leading (RASL) picture and a random access decodable leading (RADL) picture,
wherein the first flag indicates whether a third flag is present in the bitstream,
wherein the second flag indicates whether a current picture is allowed to be used as a reference picture, and
wherein the third flag is used to determine a first variable associated with a picture order count value of a long-term reference picture.

20. The method of claim 19, wherein the format rule specifies that a second variable prevNonDiscardableAu, which is used to determine a timing of a removal of a decoding unit (DU) or a decoding of the DU, is access unit (AU) specific, and is derived based on the second flag,
wherein the format rule specifies that a buffering period (BF) supplemental enhancement information (SEI) message and a picture timing SEI message, when included in the bitstream, are access unit (AU) specific,
wherein a third variable associated with the buffering period SEI message and a fourth variable associated with the buffering period SEI message and the picture timing SEI message are derived based on the second flag,
wherein the third variable is indicative of an AU comprising (i) the second identifier of the AU that is equal to zero and (ii) at least one picture that is not a RASL picture or a RADL picture and for which the second flag is equal to zero,
wherein when a current AU not being a first AU in a decoding order, the fourth variable is indicative of a previous AU in the decoding order comprising (i) the second identifier that is equal to zero and (ii) at least one picture that is not a RASL picture or a RADL picture and for which the second flag is equal to zero,
wherein the third variable is notDiscardableAu, and the fourth variable is prevNonDiscardableAu,
wherein the format rule specifies that a derivation of a fifth variable and a sixth variable associated with a first picture and a second picture is based on the second flag,
wherein the first picture is a current picture and the second picture is a previous picture in a decoding order that (i) comprises the second identifier that is equal to zero, (ii) comprises the second flag that is equal to zero, and (iii) is not a RASL picture or a RADL picture,
wherein the fifth variable and the sixth variable are a maximum value and a minimum value, respectively, of a picture order count of each of the following pictures with the first identifier that is equal to that of the first picture: (i) the first picture, (ii) the second picture, (iii) one or more short-term reference pictures referred to by all entries in reference picture lists of the first picture, and (iv) each picture that has been output with a coded picture buffer (CPB) removal time less than the CPB removal time of the first picture and a decoded picture buffer (DPB) output time greater than or equal to the CPB removal time of the first picture, and
wherein the fifth variable is maxPicOrderCnt and indicates the maximum value of the picture order count, and the sixth variable is minPicOrderCnt and indicates the minimum value of the picture order count.

* * * * *